United States Patent
Shiraishi

[11] Patent Number: 5,838,479
[45] Date of Patent: Nov. 17, 1998

[54] OPTICAL EXPOSURE UNIT AND IMAGE FORMING UNIT USED IN OPTICAL EXPOSURE UNIT

[75] Inventor: Takashi Shiraishi, Sagamihara, Japan

[73] Assignee: Kabushiki Kaisha Toshiba, Kawasaki, Japan

[21] Appl. No.: 841,694

[22] Filed: Apr. 30, 1997

Related U.S. Application Data

[62] Division of Ser. No. 408,931, Mar. 22, 1995, Pat. No. 5,715,078.

[30] Foreign Application Priority Data

Mar. 24, 1994 [JP] Japan .................................. 6-079455

[51] Int. Cl.$^6$ .................................................. G02B 26/08
[52] U.S. Cl. ......................... 359/204; 359/216; 359/205; 359/207; 347/234
[58] Field of Search .................................. 359/204–207, 359/212, 216–219; 250/234–236; 347/232–235, 243, 244

[56] References Cited

U.S. PATENT DOCUMENTS

| | | | |
|---|---|---|---|
| 4,878,066 | 10/1989 | Shiraishi | 346/108 |
| 5,064,261 | 11/1991 | Itabashi | 359/206 |
| 5,068,677 | 11/1991 | Matsuura et al. | 359/217 |
| 5,245,462 | 9/1993 | Kanai et al. | 359/216 |
| 5,251,055 | 10/1993 | Koide | 359/216 |

FOREIGN PATENT DOCUMENTS

| | | |
|---|---|---|
| 64-75239 | 3/1989 | Japan . |
| 5-34612 | 2/1993 | Japan . |
| 5-66354 | 3/1993 | Japan . |
| 5-83485 | 4/1993 | Japan . |

*Primary Examiner*—James Phan
*Attorney, Agent, or Firm*—Foley & Lardner

[57] ABSTRACT

A laser exposure unit of this invention includes a finite focal lens for providing a predetermined characteristic to beams sent from a plurality of light sources, a cylinder lens, a mirror block for forming the respective beams passed through these lenses to be one, first to third image-forming lenses for arranging a deviation characteristic at the image-forming position of the deflected beams, and one or three mirrors for emitting the beams passed through the respective image-forming lenses at a predetermined position. An irradiation of the beam corresponding to image data is provided onto the respective photosensitive members from the respective light sources by timing corrected in accordance with the amount of shift detected by a resist sensor. Therefore, there is provided an image forming unit, which can provide a color image having no missed alignment of color components, and a laser exposure unit, which is suitable for the image forming unit.

4 Claims, 14 Drawing Sheets

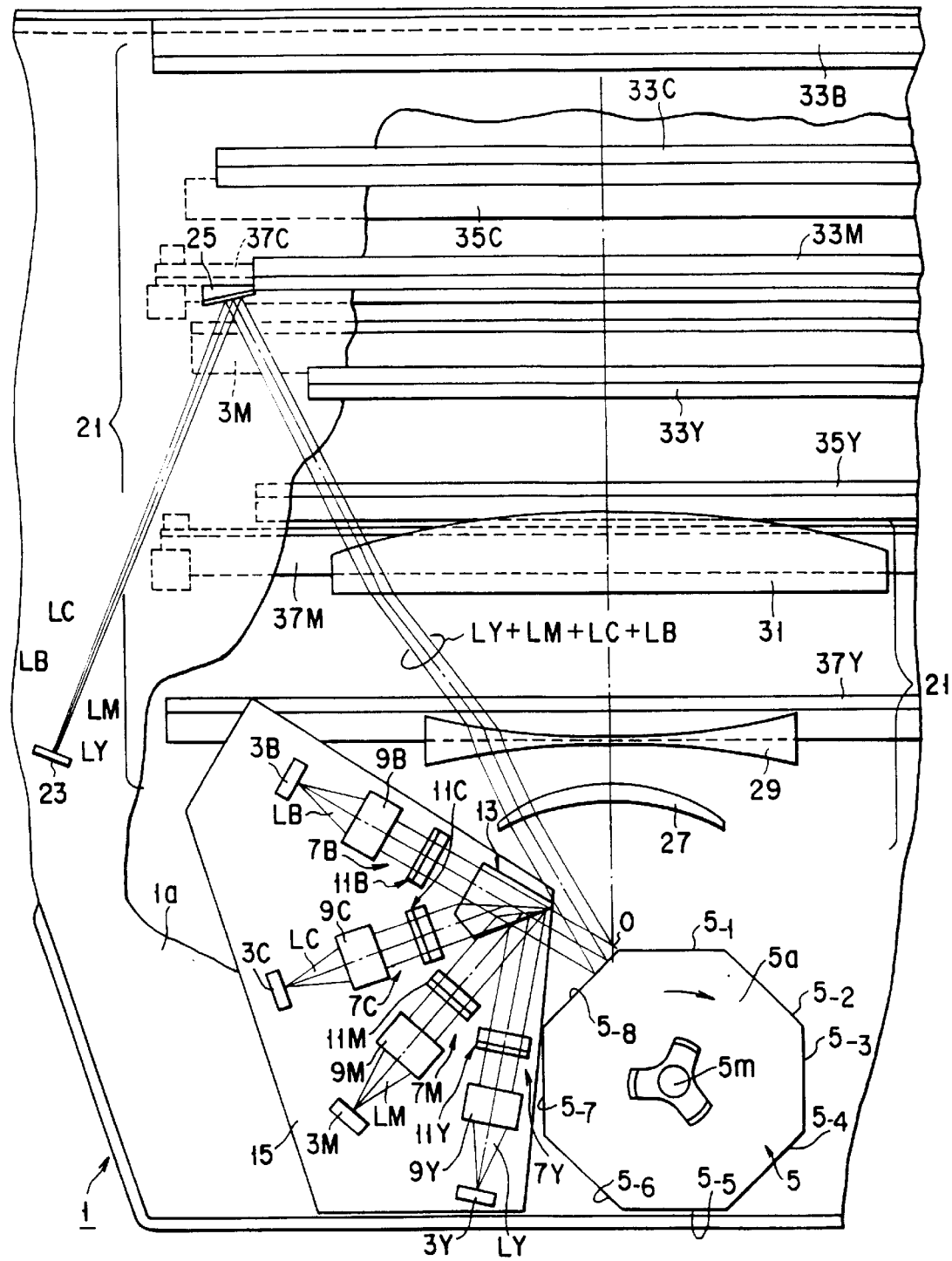
F I G. 1

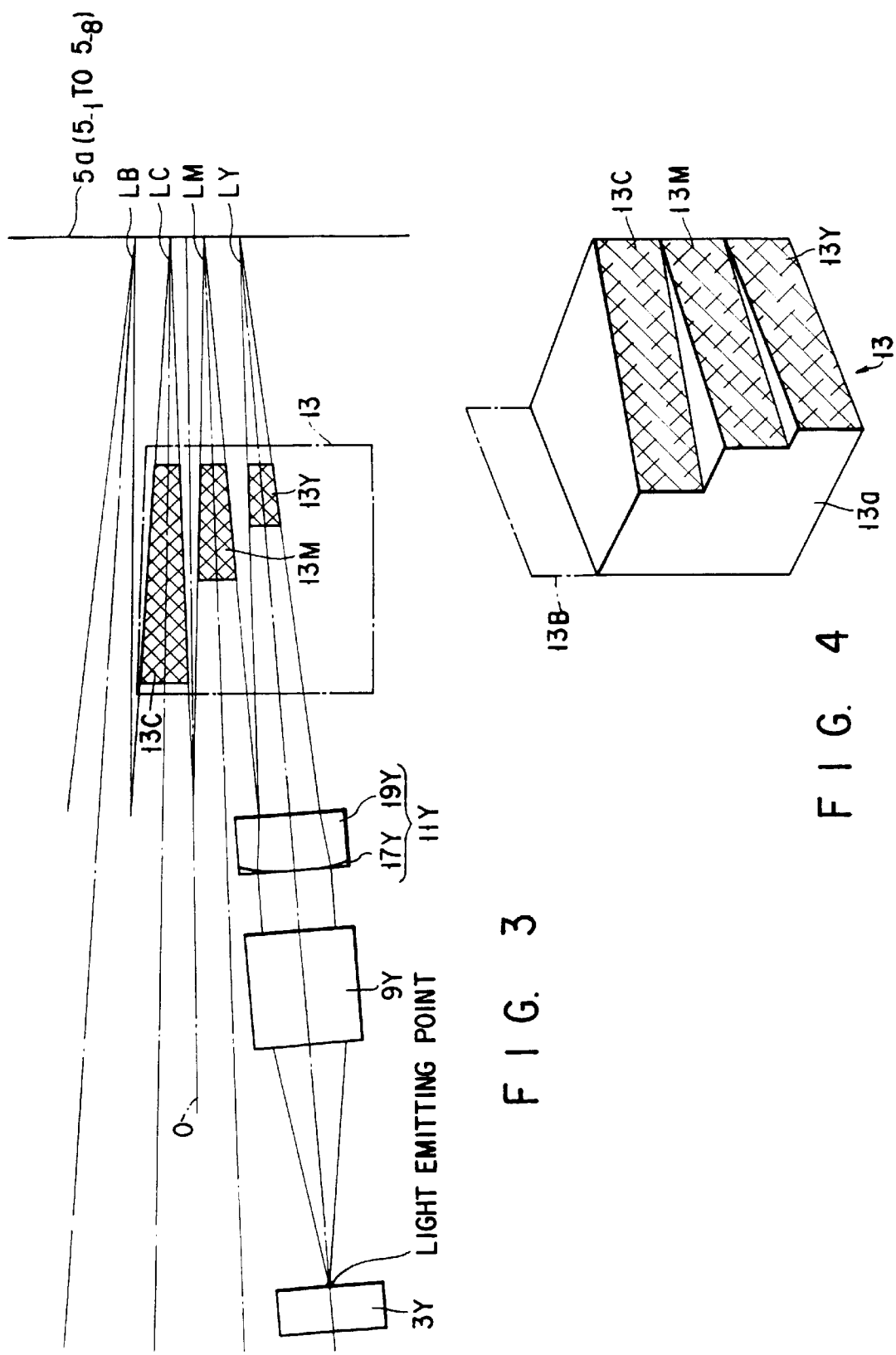

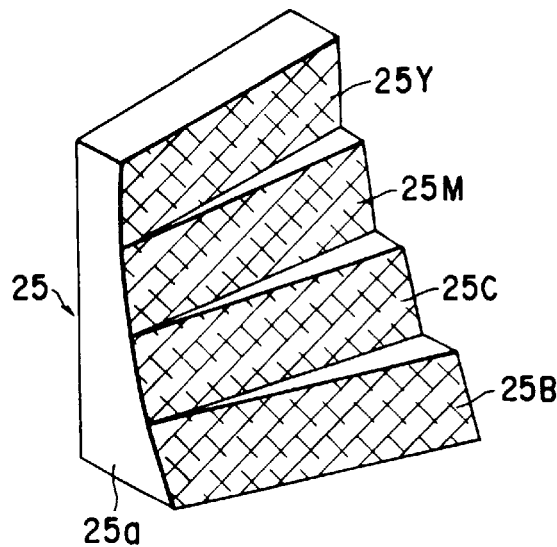
F I G. 8A
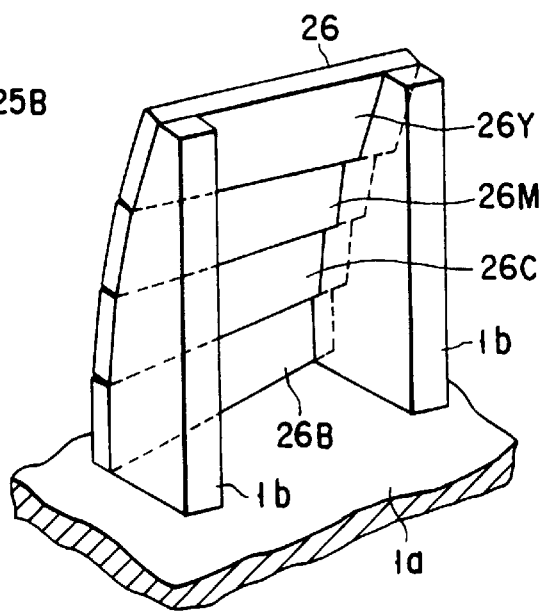
F I G. 8B
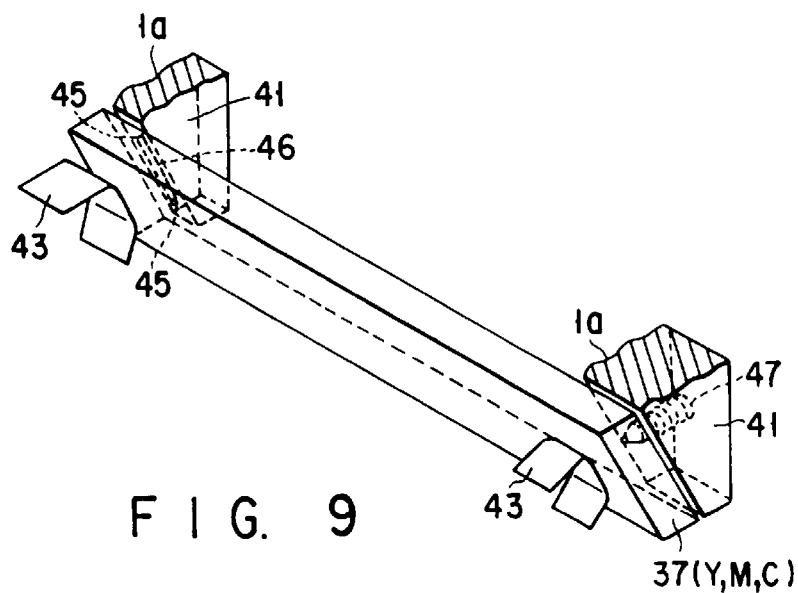
F I G. 9

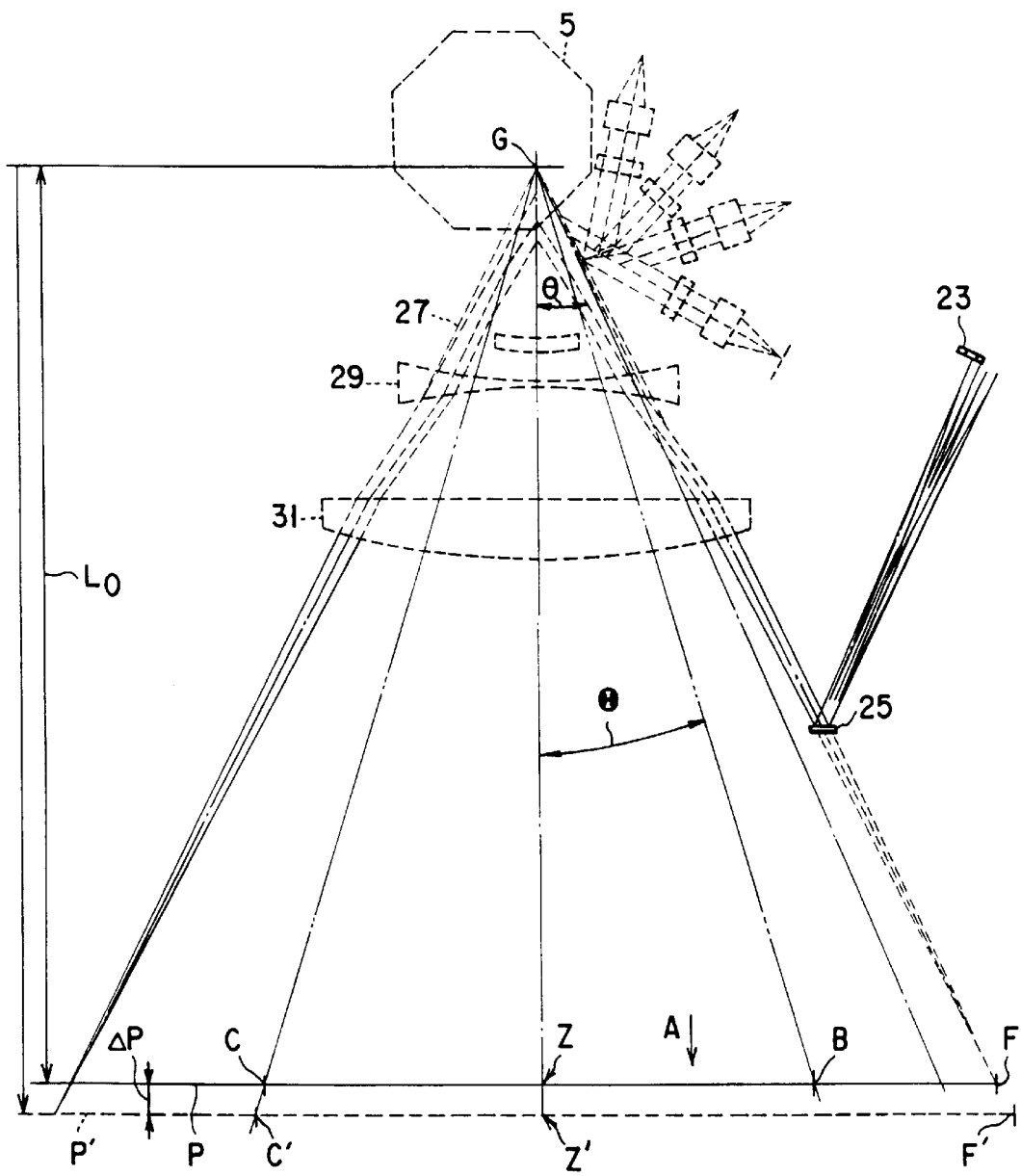
F I G. 15

OPTICAL EXPOSURE UNIT AND IMAGE FORMING UNIT USED IN OPTICAL EXPOSURE UNIT

This application is a division of application Ser. No. 08/408,931, now U.S. Pat. No. 5,715,078, filed Mar. 22, 1995.

BACKGROUND OF THE INVENTION

1. Field of the Invention

The present invention relates to a laser exposure unit and an image forming unit used in the optical exposure unit.

2. Description of the Related Art

In an image forming unit such as a color printer having a plurality of drums and a color copying machine having a plurality of drums, there are used a plurality of image forming sections for forming an image in accordance with color components, which is color-separated, and a laser exposure unit for providing a plurality of image data, i.e., a plurality of laser beams every color component. As a laser exposure unit, there are known an example in which a plurality of laser exposure units are arranged and an example in which a multi-beam laser exposure unit, which is structured to be able to provide a plurality of laser beams.

In Japanese Patent Application KOKAI Publication No. 5-83485, there is an example using N sets of a light source, a cylinder lens, and glass fθ lens groups, and N/2 of polygon mirrors wherein the number of multi-beams is N. For example, in the case of four beams, four sets of the light source, the cylinder lens glass fθ lens groups, and two polygon mirrors are used.

Japanese Patent Application KOKAI Publication No. 5-83485 discloses a unit in which a unit corresponding to four sets of laser exposure units is incorporated into one housing. As compared with the case using a plurality of laser exposure units, the space, which is occupied by the laser exposure unit, is reduced in this example. However, from the viewpoint of the single laser exposure unit, the cost of parts, and that of the assembly rise, the size, and the weight rise due to increase in the number of lenses or the number of mirrors. Moreover, it is known that the curve of the main-scanning line of the laser beam of each color component, or the deviation of the aberration characteristic on the image-forming surface such as fθ characteristic becomes uneven due to the error of the shape of the fθ lens or the error of the attachment, so as to create a miss alignment of color components on a color image forming.

Furthermore, in the example shown in Japanese Patent Application KOKAI Publication No. 5-66354, various limitations are needed in characteristics influencing astigmatism, field curve and coma aberration in a collimator lens or a finite focal lens. Due to this, the number of lenses to structure the collimator lens or the finite focal lens is increased, and the manufacturing cost is increased.

SUMMARY OF THE INVENTION

An object of the present invention is to provide an image forming device, which can provide a color image having no color sift, with a low cost, and a laser exposure unit, which is suitable for the image forming device.

Another object of the present invention is to provide a laser exposure unit, which does not need a complicated adjustment.

Further another object of the present invention is to provide a laser exposure unit, which is not subjected to deviation between beams.

According to an aspect of the present invention, there is provided an optical exposure unit for guiding beams to be scanned to a predetermined image plane, comprising: a plurality of light sources for generating a plurality of beams; first optical means for making the plurality of beams generated by the light sources close to each other to be guided; means, having a surface on which the plurality of beams guided by the first optical means are incident, for deflecting the beams incident on the surface to a predetermined direction; and second optical means, having a first toric surface having an axis extending in a predetermined direction and a second toric surface having an axis extending in a direction perpendicular to the predetermined direction, for guiding the beams deflected by the deflecting means to the image plane as a plurality of beams having a predetermined distance to each other.

According to another aspect of the present invention, there is provided an image forming apparatus for forming an image on an image forming medium, comprising: an optical exposure unit; a plurality of light sources for generating a plurality of beams; first optical means for making the plurality of beams generated by the light sources close to each other to be guided; deflecting means, having a surface on which the plurality of beams guided by the first optical means are incident, for deflecting the beams incident on the surface to a predetermined direction; second optical means, for guiding the beams deflected by the deflecting means to the image plane as a plurality of beams having a predetermined distance each other; conveying means for conveying the image forming medium; image forming means for writing a plurality of patterns on the conveying means with a predetermined distance in the main-scanning direction by driving the optical exposure unit under a predetermined condition; a pair of first and second image detecting means, for detecting the positions of the patterns written on the conveying means; image position calculation means for calculating a shift of the image formed on the conveying means based on the detection of the first and second image detecting means; and image controlling means for changing timing and frequency for forming the image on the image forming medium based on the shift of the image obtained by the image position calculation means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a partial plane view schematically showing a laser exposure unit of an embodiment of the present invention;

FIG. 3 is a view of an optical path in which a pre-deflection optical portion of the laser exposure unit of FIG. 1 is expanded;

FIG. 4 is a schematic perspective view of a mirror block of the laser exposure unit of FIG. 1;

FIGS. 8A and 8B are schematic perspective views of a mirror for detecting a horizontal sync of the laser exposure unit of FIG. 1;

FIG. 9 is a schematic perspective view showing an adjusting mechanism of an emission mirror of the laser exposure unit of FIG. 1;

FIG. 15 is a schematic view showing a method of compensating for the shift of an image surface generated by combining the laser exposure unit of FIG. 1 with the image forming unit of FIG. 10.

DETAILED DESCRIPTION OF THE PREFERRED EMBODIMENTS

An embodiment of the present invention will be described with reference to the drawings.

Figure 2:
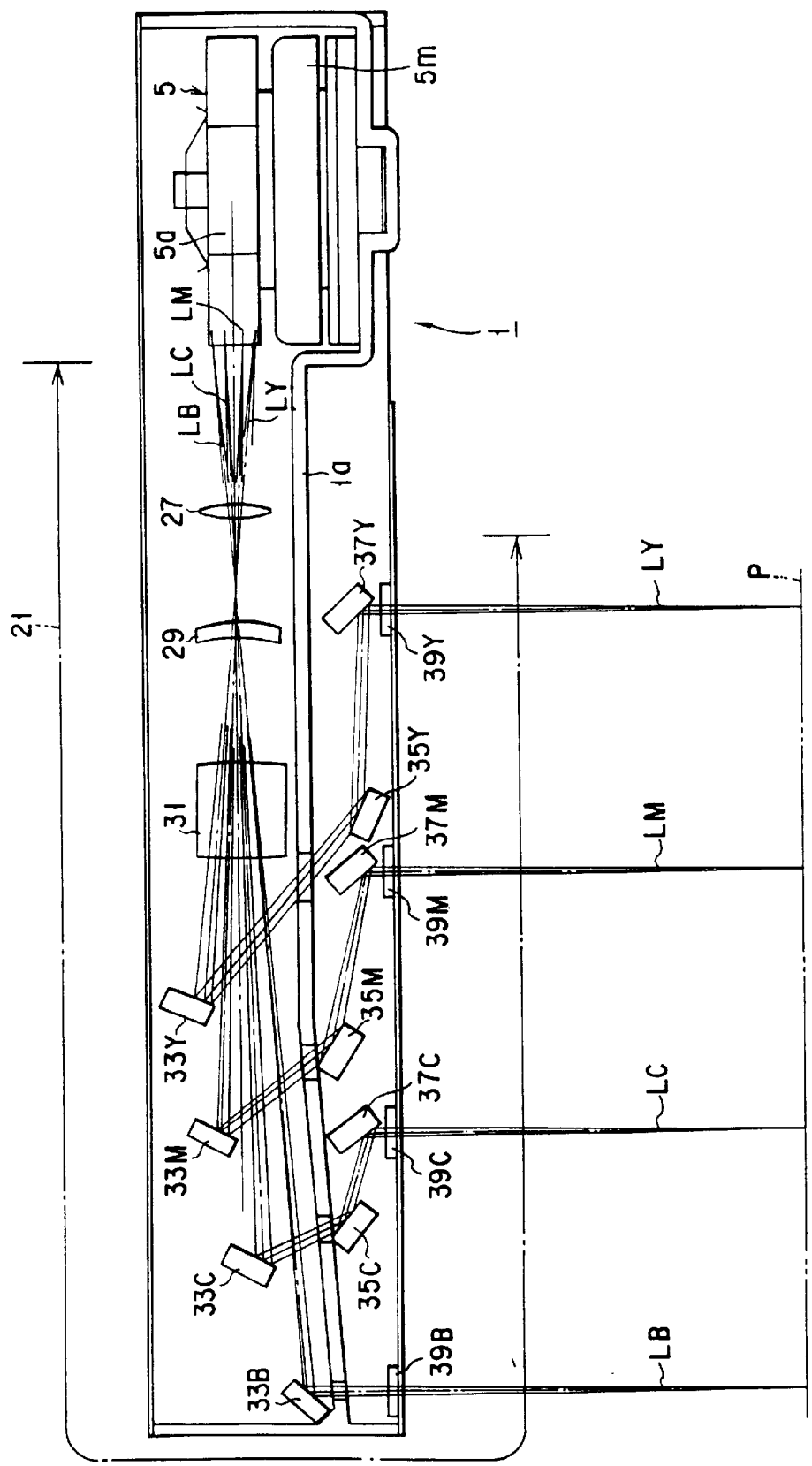
FIG. 2 is a cross sectional view of the laser exposure unit of FIG. 1 shown by cutting along an optical axis directing from a deflector to an image plane.

FIGS. 1 and 2 show a schematic plane view and a cross sectional view of a a multi-beam light scanning device of the embodiment of the present invention, respectively.

In general, according to a multi-color laser beam printer device, a unit and image data are discriminated by the subscripts of Y (Yellow), M (Magenta), C (Cyan), B (Black). In other word, in the color laser beam printer, image data, which is separated into four colors Y, M, C and B, and an image forming unit corresponding to each image data are generally used. Regarding the laser beam, a predetermined beam spot is ideally provided at a predetermined image-forming position, that is, a photosensitive surface. However, in actual, the position where the predetermined beam spot reaches does not conform to the photosensitive surface due to much aberration and diffraction. The following explanation is based on the result of the simulation of whether or not an image plane P and the photosensitive surface are conformed to each other wherein the image plane P is a surface including all positions where the predetermined beam spot reaches.

According to FIGS. 1 and 2, a multi-beam laser exposure unit 1 has a first to fourth semiconductor lasers (plurality of light sources) 3Y, 3M, 3C, and 3B and a polygonal mirror unit 5 (deflecting means). The first to fourth semiconductor lasers 3Y, 3M, 3C, and 3B generate first to fourth laser beams LY, LM, LC and LB corresponding to image data, which is color-separated in accordance with color components, respectively. The polygonal mirror unit 5 deflects each of the laser beams LY, LM, LC, and LB emitted from each of the lasers 3Y, 3M, 3C, and 3B forward the image-forming object, which is provided at a predetermined position, for example, a surface of a photosensitive member to be described laser, at a predetermined constant angular speed.

The semiconductor lasers 3Y, 3M, 3C, and 3B are arranged in order of 3Y, 3M, 3C, and 3B toward the polygonal mirror unit 5 to have a predetermined angle. The laser 3B corresponding to the B (=Black) image is provided such that the laser beam LB, directing from the laser 3$b$ toward the reflecting surface of the polygonal mirror unit 5, can be made incident onto the polygonal mirror unit 5 without being reflecting by mirrors to be described later.

Plurality of pre-deflection optical systems (first optical means) 7Y, 7M, 7C, and 7B are provided between each of the lasers 3Y, 3M, 3C 3B and the polygonal mirror unit 5. The pre-deflection optical systems 7Y, 7M, 7C, and 7B are light source side optical systems which is used such that the cross-section beam spot of each of the laser beams LY, LC, LM, and LB is adjusted to have a predetermined shape.

The polygonal mirror unit 5 includes a polygonal mirror body 5$a$ in which eight-face plane reflectors (reflecting surfaces) $5_{-1}$ to $5_{-8}$ are arranged in a shape of a regular polygon, and a motor 5$m$, which rotates the polygonal mirror body 5$a$ in a predetermined direction at a fixed speed. The polygonal mirror body 5$a$ is formed of, for example, an aluminum alloy. Each of the reflecting surfaces $5_{-1}$ to $5_{-8}$ of the polygonal mirror body 5$a$ is cut along an axis (not shown) of the polygonal mirror body 5$a$. Then, a surface protection layer formed of such as $SiO_2$ is deposited on the cut surface.

The pre-deflection optical systems 7Y, 7M, 7C, and 7B have finite focal lenses 9Y, 9M, 9C, and 9B, hybrid cylinder lenses 11Y, 11M, 11C, and 11B, respectively, and only one pre-deflection mirror block 13. Each of the finite focal lenses 9Y, 9M, 9C, and 9B of the first optical means provides a predetermined convergence to each of the beams L (Y, M, C, and B), which are emitted from each of the lasers 3 (Y, M, C, and B), in both a main-scanning direction, and a sub-scanning direction. The main-scanning direction is a first direction where the laser beams L (Y, M, C, and B) are deflected by the polygonal mirror unit 5, and the sub-scanning direction is a second direction, which is perpendicular to the first direction. Each of the hybrid cylinder lenses 11Y, 11M, 11C, and 11B of the first optical means provides further convergence to the laser beam passed through the finite focal lens 9 (Y, M, C and B) only in the sub-scanning direction. The mirror block 13 of the first optical means is used to bend each of three laser beams passed through the hybrid cylinder lens 11 (Y, M and C) toward each of the reflecting surfaces $5_{-1}$ to $5_{-8}$ of the polygonal mirror unit 5. The laser beams 3 (Y, M, C, and B), the finite focal lenses 9 (Y, M, C and B), the hybrid cylinder lenses 11 (Y, M, C, and B) and the mirror block 13 are integrally arranged on a support member formed of, for example, an aluminum alloy.

As the finite focal lenses 9 (Y, M, C and B), there is used an aspherical glass lens or a lens formed by adhering a UV (ultraviolet) light-curing plastic made aspherical portion to the surface of the spherical glass lens. The respective the finite focal lenses 9 (Y, M, C and B) are fixed onto the support member 15 through one of kinematic mount (not shown), which are formed of material having substantially the same coefficient of thermal expansion as the support member 15, such as barrel, a lens tube, a lens holding member, a lens holding ring, a lens sleeve or a lens holder.

Figure 5:
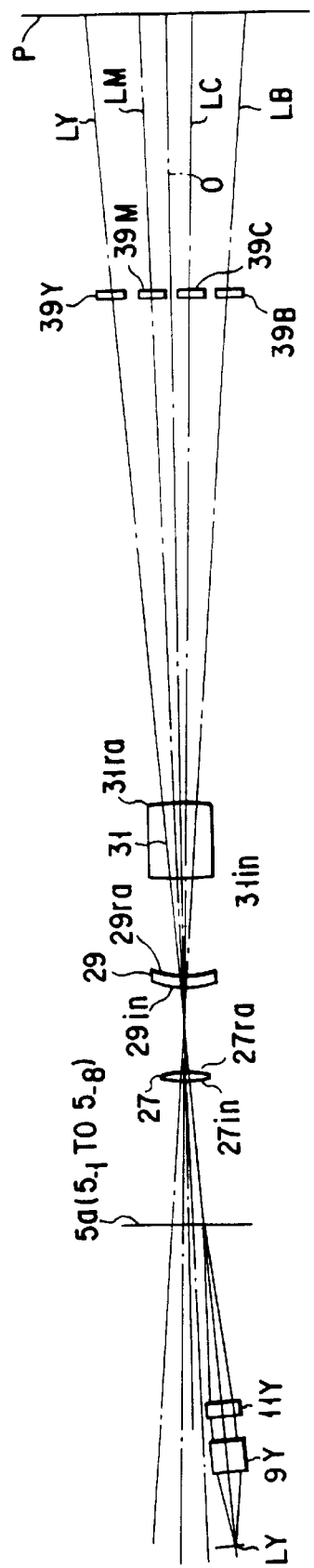
FIG. 5 is a cross sectional view of the optical path in which the mirror block of the laser exposure unit of FIG. 1 is omitted.

The hybrid cylinder lenses 11 (Y, M, C, and B) include plastic cylinder lenses 17Y, 17M, 17C, and 17B and glass cylinder lenses 19Y, 19M, 19C, and 19B, respectively, as shown in FIGS. 3 and 5. Substantially the same radius of curvature is provided to the plastic cylinder lenses 17 and the glass cylinder lenses 19 in the sub-scanning direction.

The plastic cylinder lenses 17 (Y, M, C, and B) are formed of material such as RMMA (polymethyl methacrylate) and the glass cylinder lenses 19 (Y, M, C, and B) are formed of, for example, SFS1. The plastic cylinder lenses 17 and the glass cylinder lenses 19 are fixed onto the support member 15 through one of kinematic mount (not shown), which are formed of material having substantially the same coefficient of thermal expansion as the support member 15, such as a lens holding member. The finite focal lenses 9 (Y, M, C and B) and the hybrid cylinder lenses 11 (Y, M, C, and B) may be supported by the same kinematic mount.

The mirror block 13 includes a block body 13a and a plurality of mirror portions 13Y, 13M, and 13C. The block body 13a is formed of material having a low coefficient of thermal expansion such as an aluminum alloy. The mirror portions 13Y, 13M, and 13C are arranged on a predetermined surface of the block body 13a such that the number of the mirror portions is set to be smaller than the number of colors, which can be image-formed (the number of colors separated in accordance with the color component), by one as shown in FIG. 4 (to be described later).

There are provided an image surface side optical system, which is a post-deflection optical system 21 (second optical means), a horizontal sync detector 23, and only one mirror block 25 (third optical means) for a horizontal sync between the polygonal mirror unit 5 and the image plane P. The post-deflection optical system 21 is used to substantially linearly image-form each of the laser beams L (Y, M, C, and B), which are deflected by the respective reflecting surfaces $5_{-1}$ to $5_{-8}$ of the polygonal mirror unit 5, at a predetermined position of the image plane P. The horizontal sync detector 23 detects a part of the respective laser beams L (Y, M, C, and B), which are passed through the post-deflection optical system 21, so as to define a generation timing of a horizontal sync signal to be described later. The mirror block 25 is provided between the post-deflection optical system 21 and the horizontal sync detector 23 to reflect a part of the four laser beams L (Y, M, C, and B), which are passed through the post-deflection optical system 21, toward only one horizontal sync detector 23.

The post-deflection optical system 21 includes first to third image-form lenses 27, 29, and 31 so as to provide a predetermined aberration characteristic to four laser beams L (Y, M, C, and B), which are deflected by the respective reflecting surfaces $5_{-1}$ to $5_{-8}$ of the polygonal mirror unit 5, in the wide scanning width, that is, the entire length area of the main-scanning direction at the image plane P of the laser beam scanned on the image surface by the polygonal mirror unit 5. Also, the first to third image-form lenses 27, 29, and 31 are used to control the variation of the image plane P of each laser beam.

There are provided first group of mirrors 33Y, 33M, 33C, and 33B (first optical element), second group of mirrors 35Y, 35M and 35C, and third group of mirrors 37Y, 37M and 37C (second optical elements) between the third image-form lens 31 of the post-deflection optical system 21 and the image plane P. Each of the first mirrors 33Y, 33M, 33C, and 33B are used to separate and/or bend four laser beams LY, LM, LC, and LB, which are passed through the first image-form lens 31, toward the image plane P. Each of the second mirrors 35Y, 35M beams LY, LM, and LC are passed through the optical path including the third mirrors (the number of mirrors: three), and outputted from the laser exposure unit 1, respectively. As mentioned above, the number of mirrors, which is provided in the optical path, is set to an odd number (one or three), and this point is useful to adjust the direction of the curve of the main-scanning line of each laser beam, which is caused by the inclination of any one of lenses, to the same phase (direction).

There are arranged plate-like glasses 39Y, 39M, 39C, and 39B for preventing dust at a portion among the third mirrors 37Y, 37M, 37C, and the first mirror 33B, and the image plane P and a position where the four laser beams L (Y, M, C, and B) reflected on the mirrors 33B, 37Y, 37M and 37C are outputted from the laser exposure unit 1, respectively. The plate-like glasses 39Y, 39M, 39C and 39B are used to prevent toner and/or dust from being entered the interior of the laser exposure unit 1.

The following will specifically explain the pre-deflection optical system.

FIG. 3 is a cross sectional view of a portion where the mirrors of the pre-deflection optical system 7 (first optical means) are omitted. Tables 1 and 2 show optical characteristic data of the lenses forming the pre-deflection optical system 7 and that of the and 35C and third mirrors 37Y, 37M and 37C are used to bend the three laser beams LY, LM and LC, which are further bent by the first mirrors 33Y, 33M and 33C. The first to third image-form lenses 27, 29, and 31, the first mirrors 33Y, 33M, 33C, and 33B, and second mirrors 35Y, 35M and 35C are fixed to a plurality of fixing members (not shown), which are integrally formed in an intermediate base 1a of the laser exposure unit 1, with adhesive. Also, the third mirrors 37 (Y, M and C) are arranged to be movable to at least one direction in connection with the sub-scanning direction (shown in FIG. 9 to be described later) through a fixing rib and an inclination adjusting mechanism, which are integrally formed in the intermediate base 1a. As is obvious from the drawing, the laser beam LB corresponding to the B (black) image is bent by the first mirror 33B, and guided to the image plane P without passing through the other mirrors. The respective laser beams LY, LM, LC and LB are outputted to an outer unit of the laser exposure unit 1 with substantially the equal interval by each of the third mirrors 37Y, 37M, and 37C (second optical elements) and the first mirror 33B (first optical element).

In other words, the laser beam LB (black) is passed through the optical path including the first mirror (the number of mirrors: only one), and outputted from the laser exposure unit 1. Also, the first to third laser members, which optically function. In FIG. 3, lenses corresponding to one laser beam LY (corresponding to a yellow image), and the optically functioning members are typically shown. Regarding the other laser beams LM, LC, and LB, there are only shown the outermost shell of the laser beam, which is passed through the member, provided at the side of the optical deflector 5 of the pre-deflection optical system 7, optically functioning, and an optical axis of the optical system.

Pre-deflection optical systems 7Y, 7B, 7M and 7C are formed to include the same hybrid cylinder lens 11 as the finite lens 9, to have the same distance from the laser to be symmetrical at the optical axis O.

The distance between the finite lens 9Y and the hybrid cylinder lens 11Y and the distance between the finite lens 9B and the hybrid cylinder lens 11B are formed to be the same as each other. Also, the distance between the finite lens 9M and the hybrid cylinder lens 11M and the distance between the finite lens 9C and the hybrid cylinder lens 11C are formed to be the same as each other. In this case, the distance between the lens 9Y and the lens 11Y is defined to be slightly shorter than the distance between the lens 9M and the lens 11M.

The distance between the hybrid cylinder lens 11Y and the reflecting surface of the polygonal mirror unit 5 and the distance between the hybrid cylinder lens 11B and the reflecting surface of the polygonal mirror unit 5 are formed to be the same as each other. Also, the distance between the hybrid cylinder lens 11M and the reflecting surface of the polygonal mirror unit 5 and the distance between the hybrid cylinder lens 11C and the reflecting surface of the polygonal mirror unit 5 are formed to be the same as each other. In this case, the distance between the lens 11Y and the the polygonal mirror unit 5 is defined to be slightly shorter than the distance between the lens 11M and the the polygonal mirror unit 5. In the pre-deflection optical systems 7Y, 7B, 7M and 7C, the distance between the light-emitting point 3 and the finite focal lens 9 in the respective systems is formed to be the same as each other. (Tables 1 and 2 show lens data of each cylinder lens.)

TABLE 1

Lens data I (pre-deflection optical lens data for MAGENTA, CYAN)

| curvature | | | | |
|---|---|---|---|---|
| main-scanning | sub-scanning | thickness | material | others |
| — | — | 20.872 | air | f = 20.782 |
| plane | plane | 8.492 | air | |
| plane | .039907 | 0.1 | PMMA | |
| plane | plane | 5.0 | glass | n = 1.897 |
| | | 50.075 | air | | shift from optical axis at reflecting surface $5_{-1-5-8}$ of optical deflector 1.630
shift from optical axis at reflecting surface $5_{-1-5-8}$ of optical deflector 1.477

TABLE 2

Lens data II (pre-deflection optical lens data for YELLOW, BLACK)

| curvature | | | | |
|---|---|---|---|---|
| main-scanning | sub-scanning | thickness | material | others |
| — | — | 20.872 | air | f = 20.782 |
| plane | plane | 5.475 | air | |
| plane | .039907 | 0.1 | PMMA | |
| plane | plane | 5.0 | glass | n = 1.897 |
| | | 49.992 | air | | shift from optical axis at reflecting surface $5_{-1-5-8}$ of optical deflector 4.890
inclination from optical axis at reflecting surface $5_{-1-5-8}$ of optical deflector 4.430

According to FIG. 3, the laser beam emitted from the laser 3Y is converted to a convergent beam in which the image plane P in view of the design is substantially consistent with a convergent point of the beam spot of the laser beam by the lens 9Y. Regarding the laser beam LY, which is passed through the lens 9Y, convergence is provided thereto. More specifically, the loser beam is formed such that the surface of each of the reflecting surfaces $5_{-1}$ to $5_{-8}$ of the polygonal mirror unit 5 (deflecting means) is consistent with the convergent point of the beam spot of the laser beam in the sub-scanning direction by the hybrid cylinder lens 11Y having power only to the sub-scanning direction.

The hybrid cylinder lens 11Y is formed by the cylinder lens 17Y of PMMA having substantially the same radius of curvature to the sub-scanning direction and the glass cylinder lens 19Y. More specifically, the hybrid cylinder lens 11Y is a lens, which is formed by adhering the incident surface of the cylinder lens 19Y to the emission surface of thee cylinder lens 17Y with optical cement. Moreover, the hybrid cylinder lens 11Y may be formed such that the cylinder lens 17Y is formed to be integral with the incident surface of the cylinder lens 19Y or the cylinder lens 19Y is formed to be integral with the emitting surface of the cylinder lens 17Y. The cylinder lens 19Y and the cylinder lens 17Y may be pressurized by a positioning member (not shown) from a predetermined direction, also. A surface (i.e., incident surface) contacting air of the cylinder lens 17Y is formed on substantially the plane.

Regarding the material of the cylinder lens 17Y, that is PMMA, there is used the material having substantially the same optical characteristic as the first to third image-forming lenses 27, 29 and 31 used in the post-deflection optical system 21.

The following will specifically explain the optical characteristic of the hybrid cylinder lens 11Y.

Regarding the first to third image-forming lenses 27, 29 and 31 of the post-deflection optical system 21 (second optical means), since these lenses are formed of plastic such as PMMA the refractive index changes, when the peripheral temperature is varied between 0° C. to 50° C. Thereby, it is known that a refractive index n is varied from 1.4876 to 1.4789. In this case, the sub-scanning direction image forming position is varied about ±12 mm when the laser beam, which is passed through the first to third image forming lenses 27, 29, and 31, is actually condensed on the photosensitive member to be described later.

In order to reduce the above variation, the lenses having the same material as the lenses used in the post-deflection optical system 21 (second optical means) are incorporated into the pre-deflection optical system 7 (first optical means) in the optimum curve state. Due to this, as compared with the conventional optical system in which the pre-deflection optical system 21 is formed of glass lenses and the post-deflection optical system 21 is formed of plastic lenses, the color aberration of the sub-scanning direction, which is caused by the variation of the refractive index due to the change of the temperature of the lenses of the post-deflection optical system 21, can be corrected.

As is obvious from FIG. 3, each of the laser beams LY, LM, LC and LB is made symmetrically incident onto the optical axis (optical axis of the system) of the laser exposure unit 1 in the sub-scanning direction. In other words, the laser beams LY and LB are made symmetrically incident onto the polygonal mirror 5a to sandwich the optical axis O. Also, the laser beams LM and LC are made symmetrically incident onto the polygonal mirror 5a to sandwich the optical axis O. Therefore, regarding the respective laser beams, the optimum post-deflection optical system 21 can be obtained at two portions of the sub-scanning direction. Therefore, characteristics such as a field curve and/or astigmatism can be improved. In this case, by the optimum postdeflection optical system 21, the number of lenses of the post-deflection optical system 21 may be reduced.

According to FIG. 4, the mirror block 13 is used to guide the first to fourth laser beams LY, LM, LC and LB, serving as one flux of the laser beam, to the respective reflecting surfaces $5_{-1}$ to $5_{-8}$ of the polygonal mirror unit 5.

More specifically, the mirror block 13 in the first optical means includes first to third reflecting surfaces 13Y, 13M, and 13C and a passing area 13B and block body 13a is formed each reflecting surfaces, integrally. The first reflecting surface 13Y is used to bend the laser beam LY emitted from the laser 3Y to be guided to each of the reflecting surfaces $5_{-1}$ to $5_{-8}$ of the polygonal mirror unit 5 (deflecting means). The second and third reflecting surfaces 13M and 13C are used to bend the laser beam LM from the laser 3M and the laser beam LC from the laser 3C toward each of the reflecting surfaces $5_{-1}$ to $5_{-8}$ of the polygonal mirror unit 5. The passing area 13B is used to directly guide the laser beam LB from the laser 3B to the each of the reflecting surfaces $5_{-1}$ to $5_{-8}$ of the polygonal mirror unit 5.

Each of these reflecting surfaces 13Y, 13M, and 13C is cut at a predetermined angle to the laser beam LB directly moving through the block body 13a. Thereafter, the cut surface is coated with material having high reflectance such as aluminum, or such material is deposited thereon. The cut surfaces may be polished.

According to the mirror block of FIG. 4, since the reflecting surfaces 13Y, 13M, and 13C are cut from one block body 13a, the relative inclination error of each mirror is reduced. As a method for manufacturing the block body 13a, there is used a die-cast method can be used. Therefore, there can be obtained a mirror block having high precision.

As already explained above, the laser beam LB from the laser beam 3B is passed through the passing area 13B on the block body 13a without crossing the mirror block 13 to be directly guided to each of the reflecting surfaces $5_{-1}$ to $5_{-8}$ of the polygonal mirror unit 5.

The following will explain intensity (amount of light) of each laser beam, which is reflected on the mirror block 13 and guided to each of the reflecting surfaces $5_{-1}$ to $5_{-8}$ of the polygonal mirror unit 5.

As a method for making two or more laser beams incident onto the reflecting surfaces of the polygonal mirror unit 5 as one flux of the laser beam, there is already proposed a method in which the laser beams are sequentially overlaid on each other by the plate beamsplitter. However, since the plate beamsplitter is used, it is well known that 50% of the amount of laser beam emitted from the laser is made useless every reflection and transmission (every time the laser beam is passed therethrough). In this case, even if transmissivity of the plate beamsplitter and reflectance thereof are made suitable in accordance with each laser beam, light intensity (amount of light) of any one of laser beams to be passed through the plate beamsplitter is reduced to about 25%. Moreover, it is well known that there is generated a difference between the respective laser beams in the points that the field curve and astigmatism. The generation of such a difference is caused by the points that the plate beamsplitter is inclined in the optical path and that the number of the plate beamsplitter which beam is passing through is different. On the other hand, since the field curve and astigmatism of the respective laser beams are different, it is difficult for all laser beams to be image-formed by the same finite focal lens and the cylinder lens.

In contrast, according to the mirror block 13 shown in FIG. 4, the laser beams LY, LM, and LC are bent by the normal mirror at a position placed before the polygonal mirror 5a of the polygonal mirror unit 5 and an area where the respective laser beams are mutually separated in the sub-scanning direction. Therefore, the amount of light of each laser beam to be supplied to the image plane P by the polygonal mirror 5a can be maintained to be 80% or more of the amount of emitted light from finite focal lens 9. Whereby, the output of each laser can be reduced, and the aberration of light to be reached at the image plane P can be corrected to be equal, thereby making possible to reduce the beam spot and lead to high precision. The laser 3B corresponding to B (black) is passed through the passing area 13B of the mirror block 13 to be guided to the polygonal mirror 5a. Due to this, the output capacity of the laser can be reduced, and the error of the incident angle onto the polygonal mirror 5a, which is caused by the reflection from the reflecting surface, can be removed.

Figure 6:
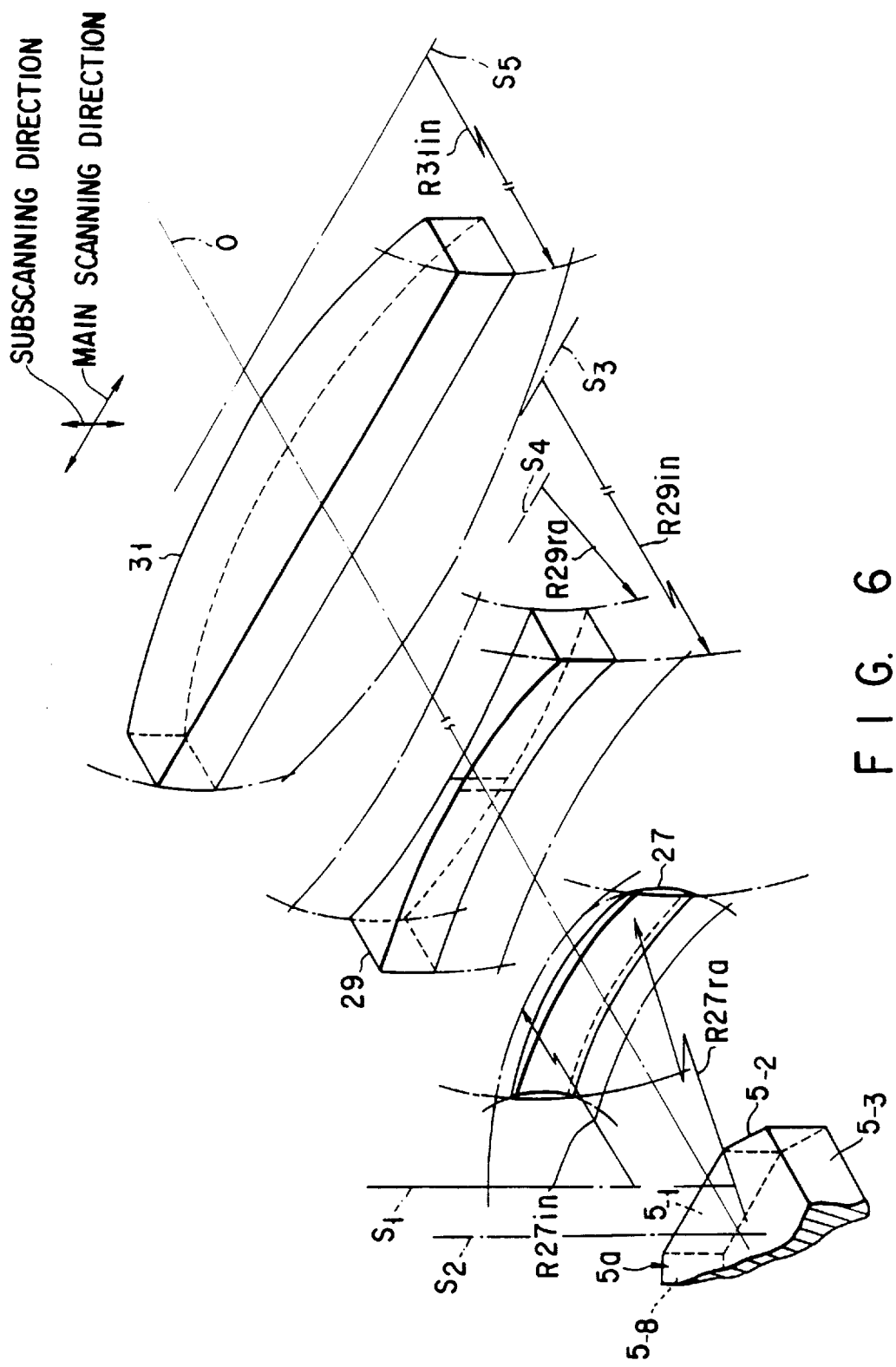
FIG. 6 is a schematic perspective view of a toric axis of each lens of a post-deflection optical portion of the laser exposure unit of FIG. 1.
Figure 7:
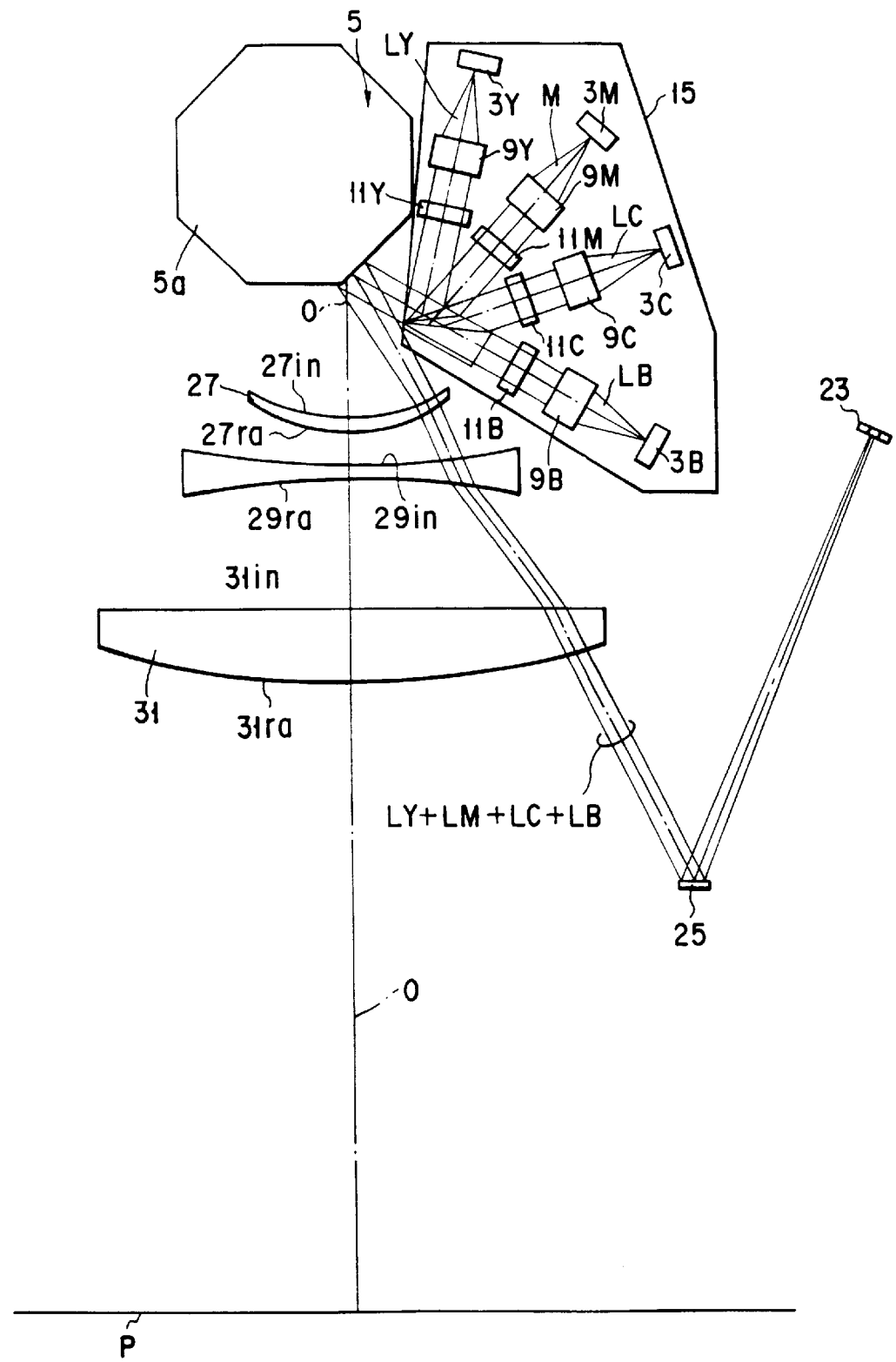
FIG. 7 is a schematic plane view showing the arrangement of the respective optical members of the laser exposure unit of FIG. 1.

The following will explain the relationship between the laser beam reflected on the polygonal mirror 5a of the polygonal mirror unit 5 and the post-reflection optical system 21 with reference to FIGS. 5 to 7. It is noted that lens data of the first to third image-forming lenses of the post-deflection optical system 21 is shown in FIG. 2. Each of these lenses is a toric lens in which at least one of incident and emitting surfaces is a toric surface.

TABLE 3

Lens data III (post-deflection optical lens data)

| curvature | | | | | |
|---|---|---|---|---|---|
| main-scanning | sub-scanning | thickness | coefficient of aspherical surface | material | direction of toric axis |
| −0.015535 | 0.028419 | 43.33 | | AIR | |
| −0.020181 | −0.020933 | 5.00 | d = .000050<br>e = −4.60492 × 10⁻⁶<br>f = 4.53305 × 10⁻⁷<br>g = −1.83422 × 10⁻⁸ | PMMA | sub-scanning direction |
| −0.0046715 | 0.030524 | 10.21 | d = 0.000040<br>e = 0.000013<br>f = −1.77739 × 10⁻⁶<br>g = 5.88475 × 10⁻⁸ | AIR | sub-scanning direction |
| 0.00356167 | 0.035746 | 3.00 | d = −2.04634 × 10⁻⁶<br>e = −1.99422 × 10⁻⁶ | PMMA | main-scanning direction |
| 0.00042023 | 0.00643 | 38.45 | d = −1.49532 × 10⁻⁶ | AIR | main-scanning |

TABLE 3-continued

Lens data III (post-deflection optical lens data)

| curvature | | | | | |
|---|---|---|---|---|---|
| main-scanning | sub-scanning | thickness | coefficient of aspherical surface | material | direction of toric axis |
| −0.003985447 | — | 22.00 | e = 1.79125 × 10$^{-10}$<br>d = −8.96162 × 10$^{-8}$<br>c = 2.39305 × 10$^{-12}$ | PMMA | direction main-scanning |
| plane | plane | 33.00 | d = −2.39035 × 10$^{-7}$<br>e = −1.90376 × 10$^{-12}$ | AIR | |
| plane | plane | 2.00 | | BK7 | |
| plane | plane | 200.00 | | AIR | |

In this case, if a coordinate system is a right-hand system, a meridian of each lens in the main-scanning direction is shown as follow:

$$z = \frac{cy^2}{1 + \sqrt{1 - c^2(cc+1)y^2}} + dy^4 + ey^6 + fy^8 + gy^{10}$$

wherein c: curvature on the optical axis in the direction parallel to the direction of the toric axis of the toric lens, cc: coefficient of conic, d: coefficient of aspherical surface, e: coefficient of aspherical surface, f: coefficient of aspherical surface, and g: coefficient of aspherical surface.

The surface whose curvature of the sub-scanning is shown by only "-" is a certain type of a lens shape, which is obtained by rotating the meridian to the optical axis. The surface whose curvature is shown by a specific value shows a shape, which is obtained by rotating the meridian at the axis moved in parallel with the direction shown in the item of the toric axis in the plane separated in the direction of axis z of the local coordinates by the amount of 1/curvature.

The following will explain the state in which the respective laser beams LY, LM, LC and LB are transmitted to the laser exposure unit 1 with reference to FIGS. 5, 6, and 7.

FIG. 5 is an expanded view of the optical axis shown by cutting the laser exposure unit of FIGS. 1 and 2 along the optical axis.

In FIG. 5, the lenses corresponding to one laser beam LY (corresponding to a yellow image), and the optically functioning members are typically shown. Regarding the other laser beams LM, LC, and LB, there are only shown the outermost shell of each laser beam and the optical axis of the optical system. Moreover, the mirrors 33Y, 33M, 33C, 33B, 35Y, 35M, 35C, 37Y, 37M, and 37C are omitted.

FIG. 6 is a perspective view showing the axis of the toric surface of the first to third image-forming lenses in the optical path shown in FIG. 5. In FIG. 6, the laser beams to be passed through the respective lenses are omitted.

FIG. 7 is an expanded view of the optical path seeing from the direction crossing the sub-scanning direction.

According to FIG. 5, the post-deflection optical system 21 includes the first to third plastic toric lenses 27, 29, and 31, and the dustproof glasses 39Y, 39M, 39C, and 39B. The first to third plastic toric lenses 27, 29, and 31 are formed of substantially the same material, e.g., RMMA (polymethyl methacrylate), as the material of the plastic cylinder lenses 17 (Y, M, C, and B) used in the hybrid cylinder lenses 11 (Y, M, C, and B). The respective laser beams LY, LM, LC, and LB, which are bundled into one flux of the laser beam in the main-scanning direction before the polygonal mirror unit, are passed through the first to third plastic toric lenses 27, 29, and 31 in substantially the same flux state, respectively.

The first plastic toric lens 27 is a lens for forming a fθ lens, serving as a main part of the post-deflection optical system 21. In other words, the first plastic toric lens 27 is a toric lens in which both the incident surface $27_{in}$ and the emitting surface $27_{ra}$ are formed on the toric surface. The toric axis of each surface of the lens 27 is extended in the sub-scanning direction in both the incident surface $27_{in}$ and the emitting surface $27_{ra}$ (see FIG. 6).

The second plastic toric lens 29 is a lens for forming a fθ lens, serving as a main part of the post-deflection optical system 21. In other words, the second plastic toric lens 29 is a toric lens in which both the incident surface $29_{in}$ and the emitting surface $29_{ra}$ are formed on the toric surface. The toric axis of each surface of the lens 29 is extended in the main-scanning direction in both the incident surface $29_{in}$ and the emitting surface $29_{ra}$ (see FIG. 6).

The third plastic toric lens 31 is a lens for forming a fθ lens, serving as a main part of the post-deflection optical system 21. In other words, the third plastic toric lens 31 is a single-side toric lens in which the incident surface $31_{in}$ is formed on the toric surface and the emitting surface $31_{ra}$ is formed on the aspherical surface. The toric axis of the incident surface $31_{in}$ of the lens 31 is extended in the main-scanning direction (see FIG. 6). It is needles to say that the emitting surface $31_{ra}$ is surface of revolution whose axis of rotation is the optical axis O.

The following will explain the toric axis of each of the first to third plastic toric lenses (image-forming lenses) 27, 29, and 31, the variation of the image plane P, and the aberration characteristics.

In the conventional optical scanning unit, the toric axes of all toric lenses are defined along the main-scanning direction when the toric lens is used. In this case, in the image plane P, the aberration characteristics such as the spherical aberration, coma aberration, field curve, or error of magnification, cannot be independently set in the sub-scanning direction by using aspherical coefficients.

In contrast, according to the present invention, the toric axis of the first plastic toric lens 27 is defined in the sub-scanning direction, so that the lens 27 is formed to be aspherical in the sub-scanning direction. Therefore, by use of the lens 27, the aberration characteristics such as the spherical aberration, coma aberration, field curve, or error of magnification, can be suitably set separately from the other toric lenses 29 and 31 by using aspherical coefficients.

As a result of the simulation of the direction of the toric axis of each of the lens surfaces $27_{in}$, $27_{ra}$, $29_{in}$, $29_{ra}$, $31_{in}$ and $31_{ra}$ of the first to third toric lenses, the following points became clear.

More specifically, in a case where the lens surface whose toric axis is defined in the sub-scanning direction exists on only one surface, the correction of the coma aberration and the spherical aberration become insufficient. As a result, when the laser beams are actually image-formed on the surface of the photosensitive member, the beam spot diameter of the cross section becomes about 100 μm. On the other hand, in a case where the lens surface whose toric axis is defined in the sub-scanning direction exists on two surfaces, the beam spot diameter of the cross section can be reduced to 50 μm when the laser beams are actually image-formed on the surface of the photosensitive member 58. The lens surface whose toric axis is defined in the sub-scanning direction is provided on only the first plastic toric lens 27. In other words, since the absolute value of radius of curvature in the main scanning direction of the first toric lens 27 is smaller than other lenses 29 and 31, the processing fixture, which is used in molding the lens 27, can be made smaller, the manufacturing cost can be reduced, and the processing precision can be improved.

By use of the second and third toric lens 29 and 31, the various aberration characteristics of the main-scanning direction are satisfactorily set, and the change of the magnification of the sub-scanning direction, which is caused by the image formed position of each beam, that is, the curve of the main-scanning direction or the change of the environment, is reduced. In other words, the radius R of the curvature of the sub-scanning direction is suitably set over the entire main-scanning area. This is performed at each position of each of the lenses in the variously limited portion where the shape of the lens of the main-scanning direction is defined to satisfy the various characteristics of the main-scanning direction. The the emitting surface $31_{ra}$ of third toric lens 31 is used to adjust the influence onto the characteristics of the sub-scanning direction, and perform a delicate adjustment of the various characteristics in the main-scanning direction.

Backing to FIG. 5, in order to reduce the positional shift of the sub-scanning direction on the image plane, which is caused by the change of refractive index or the thermal expansion due to the change of the temperature of PMMA, which is the material of each of the toric lenses 27, 29 and 31 of the post-deflection optical system 21, the laser beams LY, LM, LC, and LB, which are reflected on the polygonal mirror 5a of the polygonal mirror unit 5, are guided to the image plane P as follows.

More specifically, the laser beams LY, LM, LC, and LB are passed through the position, which is slightly shifted to the images plane P rather than the nodal point position, which is synthesized by the respective lenses of the post-deflection optical system 21, and guided to the image plane P.

For example, the lens surface passing position of each of the laser beams LY, LM, LC, and LB, which are reflected on the polygonal mirror 5a, in the sub-scanning direction is defined in the inverse direction to sandwich the optical axis between the incident surface 27 in of the first lens 27 and the emitting surface $31_{ra}$. More specifically, with reference to the laser beam LC, the laser 3C is provided on the upper portion of the optical axis O at a predetermined angle to the optical axis O. The laser beam LC sent from the laser 3C is passed through the upper portion of the optical axis O at the polygonal mirror 5a. Also, the laser beam LC is passed through the upper portion of the optical axis O and the portion close to the optical axis O at the incident surface $27_{in}$. Moreover, the laser beam LC is passed through the portion close to the optical axis O and the lower portion of the optical axis O at the incident surface $29_{in}$ of the second toric lens 29, and guided to the third toric lens 31. The passing positions of the laser beam through the lenses 27 and 31 in the sub-scanning direction can be easily set by suitably arranging the optical axes of the lenses through which the respective laser beams LY, LM, LC, and LB are passed to be guided to the polygonal mirror 5a.

With reference to FIG. 7, the respective laser beams LY, LM, LC, and LB, which are emitted from laser 3Y, 3M, 3C, and 3B, are passed through the corresponding pre-deflection optical system 7, and deflected toward the post-deflection optical system 21 through the polygonal mirror 5a, which is rotated at a predetermined speed.

As explained above, the respective laser beams LY, LM, LC, and LB, serving as one flux of the laser beams in the main-scanning direction, are guided to the polygonal mirror 5a by the mirror block 13 provided between the pre-deflection optical system 7 (Y, M, C, B) and the polygonal mirror 5a.

The respective laser beams LY, LM, LC, and LB, which are the parts of the respective laser beams passed through the first to third toric lenses 27, 29 and 31 after being reflected by the polygonal mirror 5a, and which are guided to the area out of the image area of the image plane P, are reflected by only one horizontal sync detector 23 through only one horizontal sync mirror block 25.

Backing to FIG. 2, the following will explain the relationship between each inclination of the respective laser beams LY, LM, LC, LB and the mirror 33B (first optical element) and the mirrors, 37Y, 37M and 37C (second optical elements).

As explained above, the respective laser beams LY, LM, LC, and LB to which the predetermined aberration characteristics are provided through the first to third toric lenses 27, 29, and 31 after being reflected by the polygonal mirror 5a, are separated and/or bent in the predetermined direction through the first mirrors 33Y, 33M, 33C, and 33B.

The laser beam LB corresponding to B (black image) is reflected by the first mirror 33B, and passed through the dustproof glass 39B to be guided to the image plane P. The other laser beams LY, LM, and LC are guided to the second mirrors 35Y, 35M, and 35C, respectively, and reflected toward the third mirrors 37Y, 37M, and 37C by the second mirrors 35Y, 35M, and 35C. The respective laser beams LY, LM, and LC, which are reflected by the third mirrors 37Y, 37M and 37C, are image-formed on the image plane P with substantially an equal interval through the dustproof glasses 39Y, 39M, and 39C. In this case, the laser beams LB from the mirror 33B and the laser beam LC adjacent to the laser beam LB are also image-formed on the image plane P with substantially an equal interval.

As explained above, the laser beam LB emitted from the laser 3B is passed through the pre-deflection optical system 7B excepting the mirror block 13, that is, the finite focal lens 9 and the hybrid cylinder lens 11B, and reflected by the polygonal mirror 5a. Thereafter, the laser beam LB is passed through the post-deflection optical system 21, that is, first to third toric lenses 27, 29, and 31, and reflected by the mirror 33B to be emitted to the outer unit of the laser exposure unit 1. In other words, the laser beam LB, which is emitted from the laser 3B, is reflected by only the polygonal mirror 5a and the mirror 33B, and emitted from the laser exposure unit 1. Thereby, there can be ensured the laser beam LB, which is guided by only one mirror 33B after deflection. The laser beam LB is useful as a reference beam of light in relatively correcting the other laser beams in connection with the variation of the aberration characteristics of the image on the image plane P multiplied in accordance with the number of mirrors, and the tilt of the main-scanning direction in the case that the plurality mirrors are presented in the optical path.

In the case that the plurality of mirrors are presented in the optical path, the number of mirrors relating to each laser beam after deflection is preferably set to be an odd number or an even number. In other words, as shown in FIG. 2, the number of mirrors after deflection relating to the laser beams LB is one (odd number) excepting the polygonal mirror 5a of the polygonal mirror unit 5, and the number of mirrors after deflection relating to each of the laser beams LC, LM and LY is three (odd number). It is assumed that the second mirror 35 relating to any one of laser beams is omitted. The direction of the curve of the main-scanning line, which is caused by the inclination of the lens of the laser beam (the number of mirrors is the even number) passing through the optical path where the second mirror 35 is omitted, is opposite to the direction of the curve of the main-scanning line, which is caused by the inclination of the lens of the other laser beam (the number of mirrors is the odd number). As a result, there occurs a color shift in reproducing a predetermined color.

Therefore, the number of mirrors after deflection provided in the optical path of each of the laser beams LY, LM, LC, and LB is set to be substantially the odd or even number in overlaying four laser beams LY, LM, LC, and LB to reproduce a predetermined color.

The respective laser beams LY, LM, LC and LB reflected by the polygonal mirror 5a are guided to the mirror block 25 as one flux of beam in the main-scanning direction at the time when they are emitted from the emitting surface $31_{ra}$ of the third toric lens 31. However, at the time when the respective laser beams LY, LM, LC and LB reach the respective reflecting surface of the mirror block 25, these laser beams are largely separated in the sub-scanning direction. In this case, it is conventionally required that the plurality of the horizontal sync detectors 23 be provided to adjust to the number of the laser beams (the number of separated color components). Due to this, in addition to the increase in the number of detectors 23, it is well known that there occurs a problem in that the sensitivity and position of each detector must be corrected.

FIGS. 8A and 8B show only one mirror, which can guide the respective laser beams LY, LM, LC and LB, which are passed through the optical path shown in FIG. 7 and deflected to the image plane P, to the horizontal sync detectors.

In FIG. 8A, the mirror block 25 (third optical means) has first to fourth mirror surfaces 25Y, 25M, 25C, and 25B, which are formed at a different angle to both the main-scanning direction and the sub-scanning direction, and a mirror block 25a for holding the mirror surfaces 25Y, 25M, 25C, and 25B as one unit so as to reflect the respective laser beams LY, LM, LC and LB in the main-scanning direction at a different timing against the detector 23 and to provide substantially the same level (height) on the detector 23 in the sub-scanning direction.

The mirror block 25a is formed of, for example, polycarbonate containing glass. The respective mirror surfaces 25Y, 25M, 25C, 25B of the mirror block 25a are formed to be as one unit at a predetermined angle. Or, metallic material such as aluminum is deposited on portions cut from the mirror block 25a. The mirror surfaces are shaped to be removed from the mold without providing an under-cut at the portions corresponding to the mirror surfaces.

As mentioned above, the respective laser beams LY, LM, LC and LB, which are deflected by the polygonal mirror unit 5, can be made incident onto one detector 23. In addition, regarding the problems of the sensitivity of each detector and positional shift, which are caused in the unit having the plurality of detectors, the shift of the horizontal sync signal, which is caused by such sensitivity or the positional shift, can be removed.

It is needless to say that the laser beams are made incident onto the detector 23 four times per one line of the main-scanning direction by use of the mirror block 25.

FIG. 8B shows a modification of the mirror block 25 shown in FIG. 8A.

As shown in FIG. 8B, a mirror 26 may be formed by sequentially adhering four mirrors 26Y, 26M, 26C, and 26B onto a fixing member 1b, which is formed to be integral with an intermediate base 1a. In this case, a mirror holding surface for holding each mirror is shaped such that no under-cut is needed in forming the fixing member 1b.

By use of the mirror block 25 of FIG. 8A or the mirror 26 of FIG. 8B, the number of electrical parts, which are necessary for detecting the horizontal sync signal, can be reduced. The laser beam LY, LM, LC, and LB are made incident onto the detector 23 one by one. The detector 23 may detect the fact that the respective laser beams are made incident thereon. Therefore, even if the flatness of each of the reflecting surfaces $5_{-1}$ to $5_{-8}$ of the polygonal mirror unit 5 is insufficient in the sub-scanning direction, the writing position of each of the laser beams can be correctly detected.

FIG. 9 is a schematic perspective view showing a support mechanism of the third mirrors 37Y, 37M and 37C (second optical elements).

In FIG. 9, the third mirror 37 (one of the plurality of mirrors 37 is typically explained below) is supported at a predetermined position of the intermediate base 1a of the laser exposure unit 1 by fixing sections 41, which are formed to be integral with the intermediate base 1a, and a mirror holding plate springs 43, which are opposite to the fixing sections 41 to sandwich the corresponding mirrors.

Each of the fixing sections 41 are formed to be paired with each other at both ends portions in the longitudinal direction of each of the mirrors 37. On one of the pair of fixing sections 41, there are formed two projections 45 for holding the mirror 37 at two points. As shown by a dotted line of FIG. 9, ribs 46 may be used in stead of two projections 45. On the other of the pair of fixing sections 41, there is a stop screw 47 to movably support the mirror held by the projections along the optical axis.

As is obvious from FIG. 9, the mirror 37 is moved in the direction of the optical axis by moving the stop screw 47 back and fourth in a state that the axis line defined by the projections 45 are used as an axis. Therefore, the inclination of the scanning line, which is scanned to the image plane P after the reflection by the mirror 37, can be adjusted. The parallel distance, that is, the pitch of the sub-scanning direction is electrically corrected without being optically adjusted.

By the above-explained mirror adjusting mechanism, the inclinations of the plurality of the lenses, which are provided between the respective mirrors 37Y, 37M, and 37C and the respective lasers 3Y, 3M and 3C, the inclination of the single lens, are corrected relatively, whereby preventing the generation of defocus (to be described later, see FIG. 16) when beams adjusted absolute position.

Figure 10:
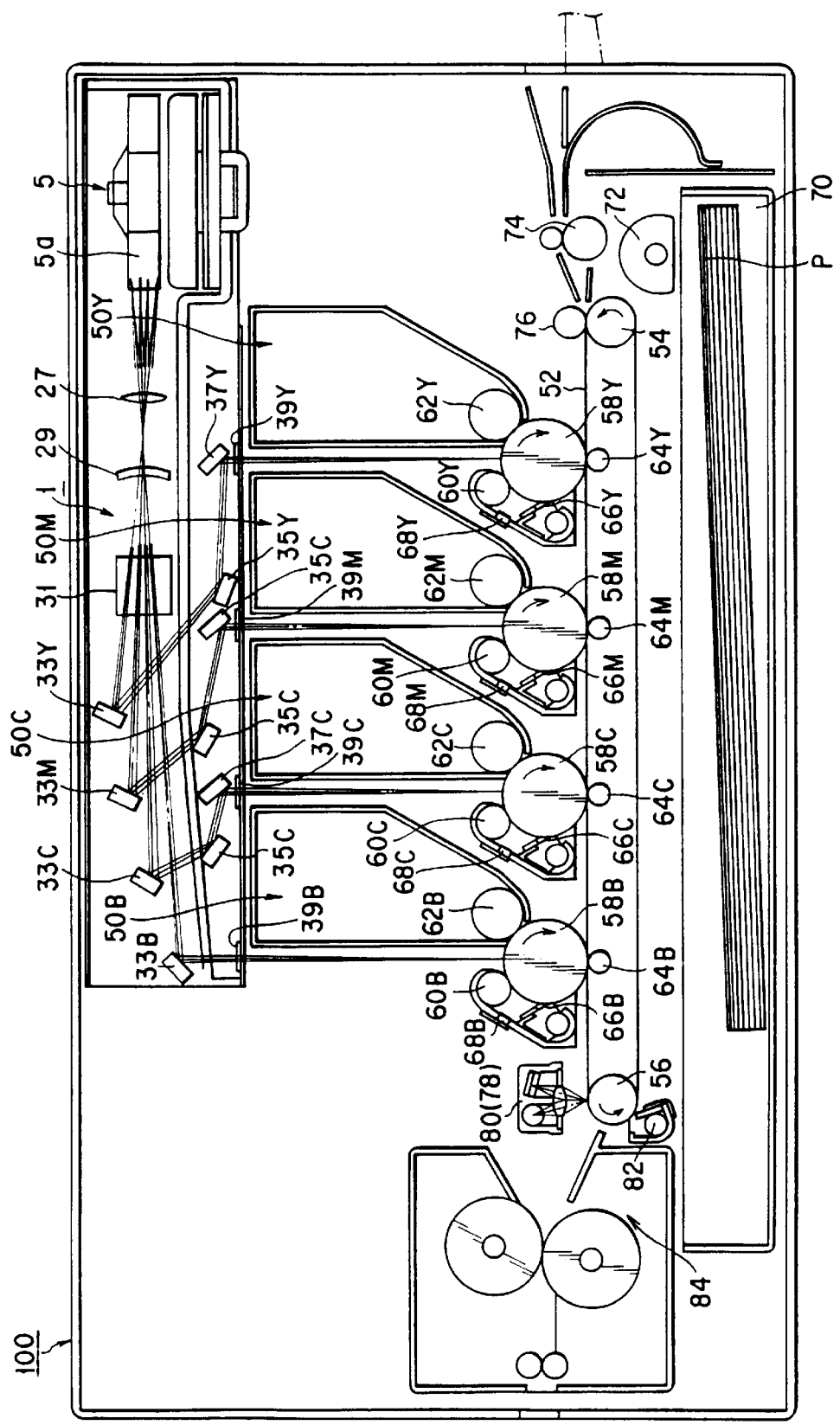
FIG. 10 is a schematic cross sectional view of an image forming unit to which the laser exposure unit of FIG. 1 is used.

FIG. 10 shows an image forming unit in which the multi-beam light scanning device, which is already explained by FIGS. 1 to 9, is used.

FIG. 10 is a front cross sectional view of a color image forming unit of a quadruple-drum system.

An image forming unit 100 has first to fourth image forming units 50Y, 50M, 50C, and 50B for forming an image of each of components, which are color-separated into Y (Yellow), M (Magenta), C (Cyan), and B (Black).

The respective image forming units 50 are provided under the laser exposure unit 1 in series in order of 50Y, 50M, 50C, and 50B so as to correspond to the position where the laser beams LY, LM, LC, LB corresponding to the respective color components are emitted through the respective third mirrors 37Y, 37M, 37C, and 33B.

A transfer belt 52 is provided under the respective image forming units 50 to transfer the image formed by the respective image forming units 50Y, 50M, 50C, and 50B.

The transfer belt 52 is stretched on a belt drive roller 56 and a tension roller 54, and rotated at a predetermined speed in a direction where the belt drive roller 56 is rotated.

The respective image forming units 50Y, 50M, 50C, and 50B include photosensitive members 58Y, 58M, 58C, and 58B. The photosensitive members 58Y, 58M, 58C, and 58B, which are shaped like a cylindrical drum to be rotatable in a direction of an arrow, form an electro-static latent image corresponding to each image.

There are arranged charge units 60 (Y, M, C, B), developing units 62 (Y, M, C, B), transfer units 64 (Y, M, C, B), cleaners 66 (Y, M, C, B), and discharge units 68 (Y, M, C, B) around the respective photosensitive members 58Y, 58M, 58C, and 58B in order of the rotational direction of the photosensitive members 58 (Y, M, C, B).

Each of the charge units 60 provides a predetermined voltage on the surface of each of the respective photosensitive members 58 (Y, M, C, B).

Each of the developing units 62 develops the electrostatic latent image on the surface of each of the photosensitive members 58 with toner to which the corresponding color is provided.

Each of the transfer units 64 transfers an toner image, which is formed on each of the photosensitive members 58, to a recording medium, which is transferred through the transfer belt 52, in a state that the transfer belt 52 is provided between each of the photosensitive members 58 and each of the transfer unit to be opposite to each of the photosensitive members 58.

Each of the cleaners 66 removes the residual toner, which is left on each of the photosensitive members 58 after each toner image is transferred through each of the transfer units 64.

Each of the discharge units 68 removes the residual voltage, which is left on each of the photosensitive members 58 after each toner image is transferred through each of the transfer units 64.

Irradiation of the respective laser beams LY, LM, LC, and LB, which are guided by the respective mirrors 37Y, 37M, 37C and 33B of the laser exposure unit 1, is provided between the respective charge units 60 and the respective developing units 62.

A paper cassette 70 is provided under the transfer belt 62 to contain the recording medium for transferring the image formed by each of the image forming units 50, that is, paper P.

A feeding roller 72 having a semicircular cross section is provided at the position, which is one end portion of the paper cassette 70 and a portion close to the tension roller 54, so as to pick up paper P contained in the paper cassette 70 one by one from the uppermost section.

A resist roller 74 is provided between the feeding roller 72 and the tension roller 54. The resist roller 74 is used to conform the top end of one paper P, which is picked up from the cassette 70, to the top end of each toner image formed on the respective photosensitive members 58 by the respective image forming units 50, particularly the toner image formed on the photosensitive member 58B by the image forming unit 50B.

There is provided an adsorption roller 76 at a portion between the resist roller 74 and the first image forming unit 50Y, that is, a portion close to the tension roller 54, substantially on an outer periphery of the tension roller 54. The adsorption roller 76 provides a predetermined electrostatic adsorption. The axis of the adsorption roller 76 and the tension roller 54 are arranged to be parallel with each other.

There are provided resist sensors 78 and 80 at a portion, which is one end of the transfer belt 52, and close to the belt drive roller 56, substantially on an outer periphery of the belt drive roller 56 to have a predetermined distance in an axial direction of the belt drive roller 56. The resist sensors 78 and 80 detect the position of the image formed on the transfer belt 52 (FIG. 10 is the front cross sectional view showing only the back sensor 80).

A transfer belt cleaner 82 is provided on the transfer belt 52 corresponding to the outer periphery of the belt drive roller 56. The transfer belt cleaner 82 removes toner adhered on the transfer belt 52 or paper dust from paper P.

A fixing unit 84 is provided in a direction where paper P transferred through the transfer belt 52 is detached from the tension roller 56 and further transferred. The fixing unit 84 is used to fix the toner image, which is transferred onto paper P, to paper P.

Figure 11:
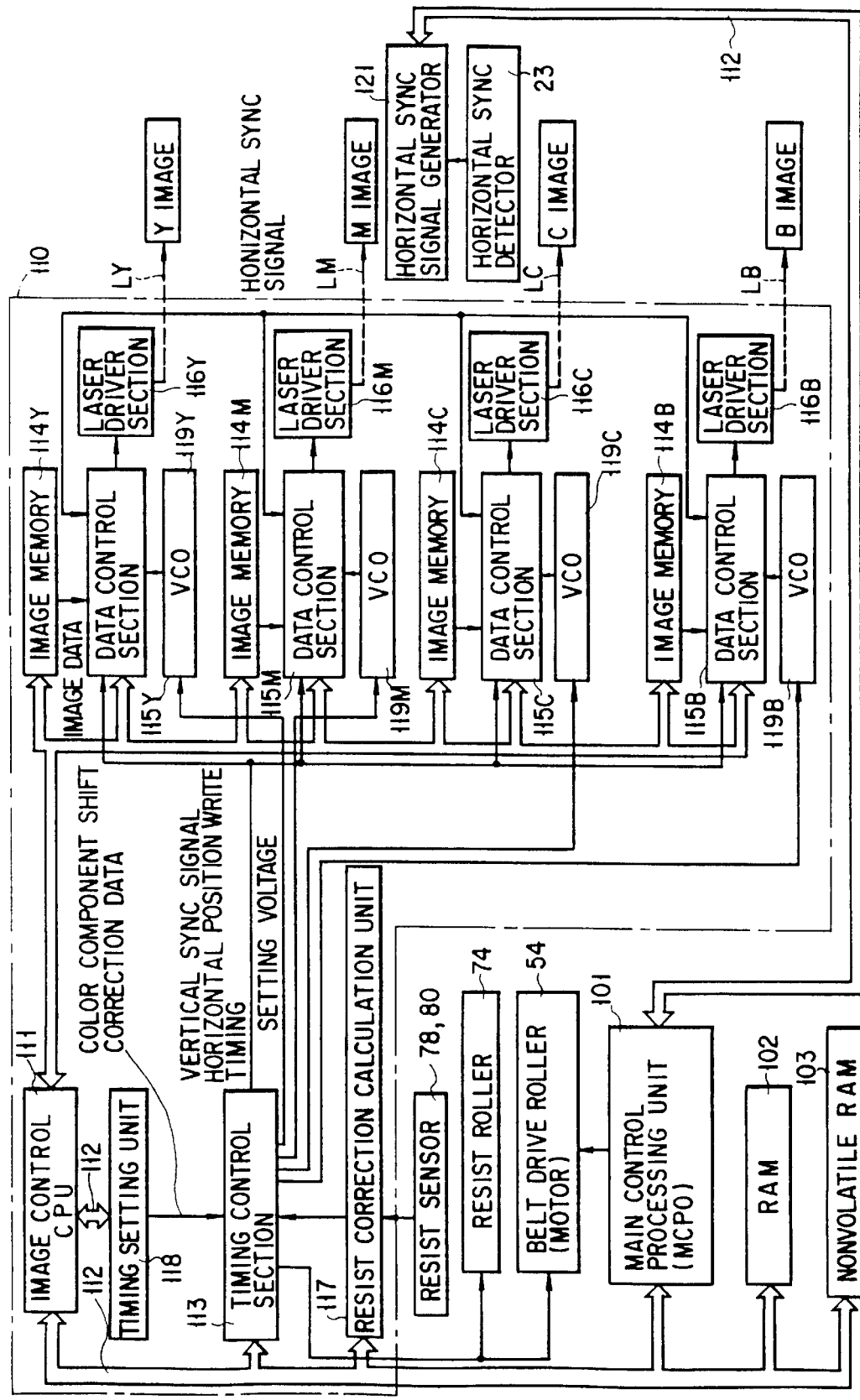
FIG. 11 is a block diagram of an image controlling section of the image forming unit of FIG. 10.

FIG. 11 is a schematic block diagram of an image control section for controlling an image forming operation of the image forming unit shown in FIG. 10.

The image forming unit 100 includes an image control section 110.

The image forming unit 100 has a plurality of control units such as an image control CPU 111, a timing control section 113, data control sections 115Y, 115M, 115C and 115B corresponding to the respective color separated components.

The image control CPU 111, timing control section 113, and data control sections 115 are mutually connected to each other through a bus line 112.

A main control unit 101 is connected to the image control CPU 111. The main control unit 101 controls an operation of the mechanical elements of the image forming unit 100 such as a motor or a roller through the bus line 112. Also, the main control unit 101 controls a voltage value or an amount of current to be applied to the electrical elements such as the charge units 60, the develop units 62, or the transfer units 64.

A ROM (read only memory), a RAM 102 (random access memory), and a nonvolatile memory 103 are connected to the main control unit 101. The ROM stores initial data for operating the unit 100 or a test pattern (not shown). The RAM 102 temporarily stores inputted image data or compensation data calculated in accordance with the outputs of the resist sensors 78 and 80. The nonvolatile memory 103 stores various compensation data obtained by an adjusting mode to be described later.

The timing control section 113 includes image memories 114Y, 114M, 114C, and 114B, laser drive sections 116Y, 116M, 116C, 116B, a resist compensation calculation unit 117, a timing setting unit 118, and voltage controlled oscillators (VCO) 119Y, 119M, 119C, and 119B.

The image memories 114 store image data of the respective color separated components. The laser drive sections 116 drive lasers 3Y, 3M, 3C and 3B to provide irradiation of the laser beams to the respective photosensitive members 58 based on the respective image data in memories.

The resist compensation calculation unit 117 calculates an amount of compensation of timing for writing the image from the laser beams LY, LM, LC, and LB based on the outputs of the first and second resist sensors 78 and 80.

The timing setting unit 118 defines timing for operating the respective mechanical elements of the respective image forming units 50 and the lasers 3 of the laser exposure unit 1.

The voltage controlled oscillators 119 correct an scanning line length error peculiar to the respective image forming units 50 and a shift caused by each optical path of the laser exposure unit 1.

The timing control section 113 is a microprocessor including the RAM section for storing compensation data therein. The timing control section 113 is used in, for example, ASIC (Application Specific Integrated Circuit) based on the individual specification.

The respective data control sections 115 are microprocessors including a plurality of latch circuits and OR gates. The data control sections 115 are also used in, for example, ASIC.

The resist compensation calculation unit 117 is a microprocessor including at least four pairs of comparators and OR gates. Also, the resist compensation calculation unit 117 is used in, for example, ASIC.

VOCs 119 are oscillators, which can vary the frequency to be outputted in accordance with the voltage to be applied. VOCs 119 have a frequency variable range of about ±3%. As this kind of oscillators, a harmonic oscillator, an LC oscillator, or a simulated reactance variable LC oscillator are used. Moreover, as VCO 119, there is used a circuit device into which a converter, which converts the output waveform from a sine wave to a rectangular wave, is incorporated.

In the respective memories 114, image data, which is sent from an outer storage unit (not shown) or a host computer, is stored.

Moreover, the output of the horizontal sync detector 23 of the laser exposure unit 1 is converted to a horizontal sync signal H-sync through a horizontal sync signal generator 121, and inputted to the timing control section 113 and respective data control sections 115.

The following will explain an operation of the image forming unit 100 with reference to FIGS. 10 and 11.

The image forming unit 10 can be operated in two modes, that is, a image forming (normal) mode for forming an image on paper P transferred through the transfer belt 52, and a resist compensation (adjustment) mode for directly forming an image on the transfer belt 52.

Figure 13:
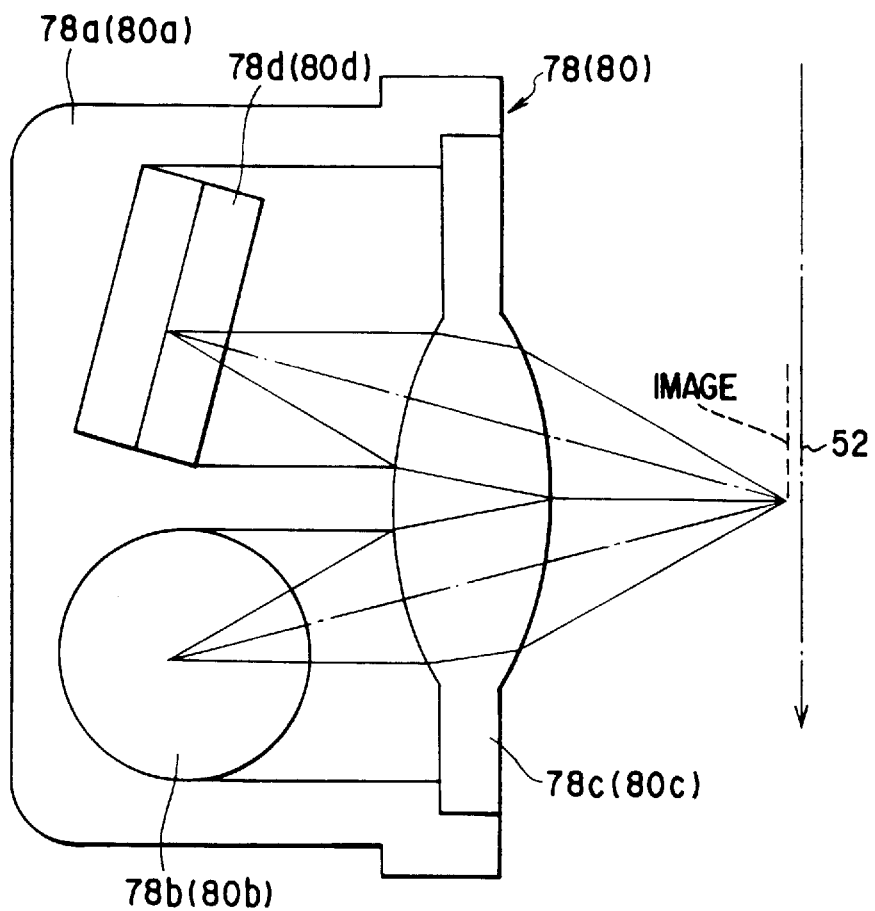
FIG. 13 is a schematic cross sectional view of a resist sensor of FIG. 12.

FIG. 13 is a schematic cross sectional view of the resist sensors 78 and 80 (In this figure, the sensor 78 is typically shown since the sensors 78 and 80 are substantially the same).

The sensor 78 (or 80) includes a housing 78a (80a), a light source 78b (or 80b) for a reference light, a convex lens 78c (or 80c), and a photosensor 78d (or 80d). The light source 78b (or 80b) is provided at a predetermined position of the housing 78a (or 80a) to provide irradiation of light including a predetermined wavelength, at least about 450, 550, and 600 nm, in the image on the transfer belt 52. The convex lens 78c (or 80c) focuses the light generated from the light source 78b (or 80b) on the image formed on the transfer belt 52, and image-forms the light reflected by the image on the the photosensor 78d (or 80d). The photosensor 78d (or 80d) detects the reflected light from the image focused by the convex lens 78c (or 80c) to be converted to an electric signal.

Figure 12:
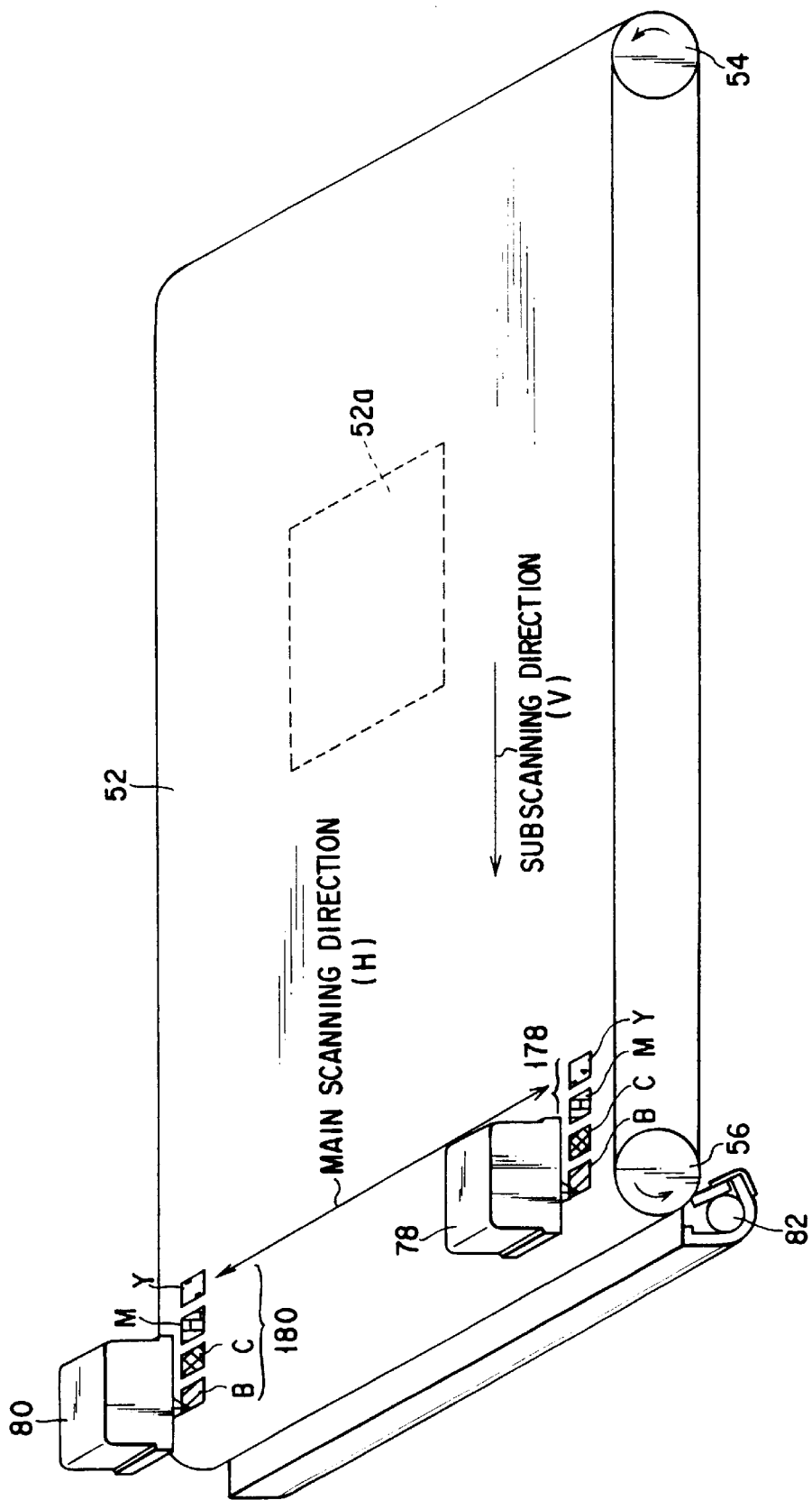
FIG. 12 is a schematic view showing a method of a resist compensation in the image forming unit of FIG. 10.

The photosensor 78d (or 80d) is provided by an area division type pin diode (FIG. 14A) having a first and second light detection areas 78A and 78B (or 80A and 80B) divided along the main-scanning direction H (FIG. 12) perpendicular to the sub-scanning direction V (FIG. 12). The wavelength of about 450, 550, and 600 nm required in the light source 78b (or 80b) is a peak wavelength of an absorption spectrum distribution of each toner of Y (Yellow), M (Magenta), C (Cyan), and B (Black) so as to be ensured to maintain sensitivity of detection against each toner. The lateral magnification of the convex lens 78c (or 80c) is −1.

The following will explain the resist compensation (adjustment) mode.

FIG. 12 is a perspective view showing a cut portion in the vicinity of the transfer belt of the image forming unit shown in FIG. 10 to explain the resist compensation mode. As already explained, the resist sensors 78 and 80 are arranged to have a predetermined interval in the width direction of the transfer belt 52, that is, the sub-scanning direction V. A line (imaginary line) connecting to the mutual center of the resist sensors 78 and 80 is defined to be substantially parallel to the axial line of the respective photosensitive members 58. Preferably, the line connecting to the center of the resist sensors 78 and 80 is provided to be correctly parallel to the photosensitive member 58B of the image forming unit 50B.

Figure 14A:
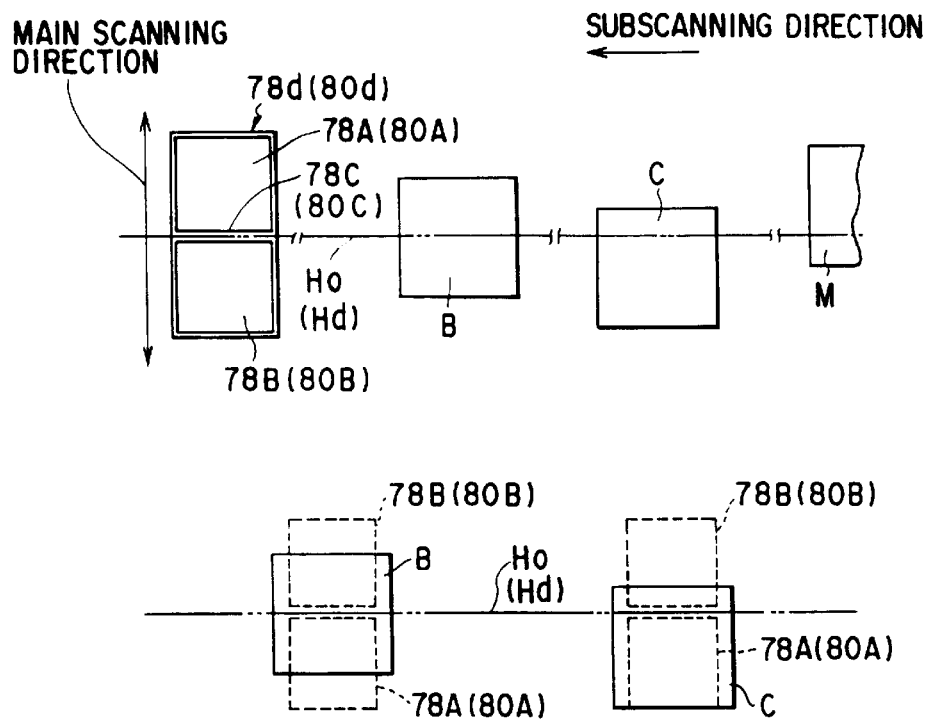
FIGS. 14A and 14B are schematic views showing a resist detection output of the resist sensor of FIGS. 12 and 13.
Figure 14B:
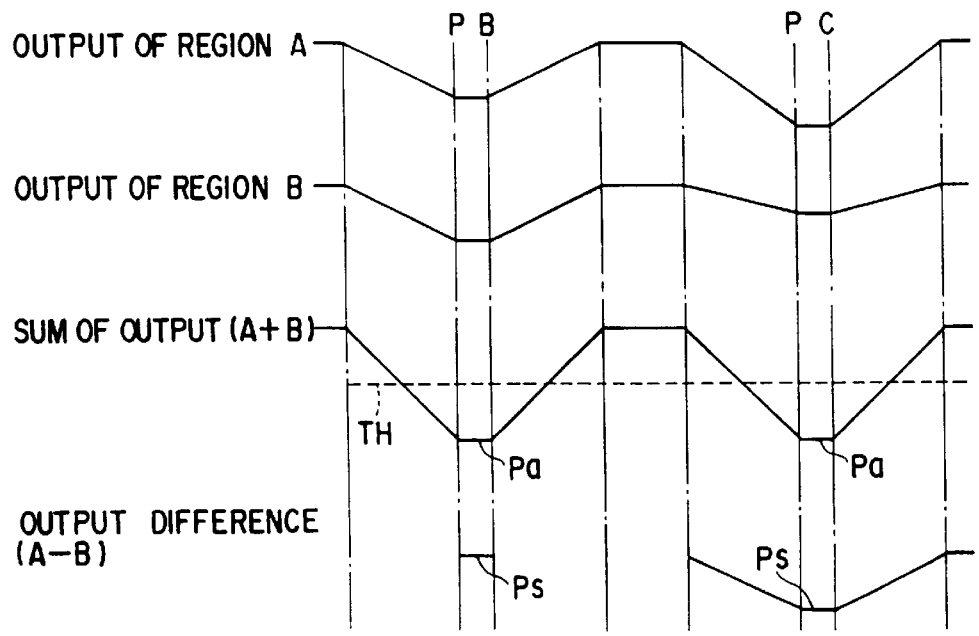

FIGS. 14A and 14B are schematic views showing the principle in which the position of the image can be detected through the resist sensors 78 and 80.

In FIG. 14A, the photosensor 78d of the resist sensor 78 is provided to conform a boundary section 78C between the first and second detection areas 78A and 78B to a reference position Ho relating to the main-scanning direction H of the image formed on the transfer belt 52. Similarly, the photosensor 80d of the resist sensor 80 is provided to conform a boundary section 80C between the first and second detection areas 80A and 80B to a reference position Ho relating to the main-scanning direction H of the image formed on the transfer belt 52. The images are passed through the sensor in order of B, C, M, and Y (image Y is omitted).

In FIG. 14B, the lateral magnification of the convex lens 78c (or 80c) is −1, since the output voltage is outputted from the pin diode on the opposite side of the design center Ho (Hd) of the main-scanning direction since the direction of the shift of the image is reversed by the convex lens 78c.

For example, since the image B is substantially linearly symmetrical to the reference position Ho (Hd) of the main-scanning direction, the outputs from the corresponding pin diodes 78A (80A) and 78B (80B) are substantially the same.

On the other hand, since the image C is shifted to the side of the area B at the center of the reference position Ho (Hd) of the main-scanning direction, the outputs from the corresponding pin diodes 78A (80A) and 78B (80B) become A<B.

The sum of the outputs of the pin diodes corresponding to the images B and C, that is, A+B, and the difference, that is, A−B are obtained, and A+B value is thresholded by a predetermined threshold level TH and A−B value is measured. Whereby, the center of the sub-scanning direction V and the center of the main-scanning direction H of the respective images B and C can be detected. In other words, where the sum (A+B) of the outputs of the pin diode exceeds the threshold level TH, whereby the reference position of the sub-scanning direction of the corresponding image can be detected. Also, by measuring the difference (A−B) of the outputs of the peak or valley level Ps, the center of the main-scanning direction H can be detected.

Backing to FIG. 12, the belt drive roller 56 is rotated in the direction of the arrow, thereby the transfer belt 52 is moved to the direction where the area 52a is directed from the roller 54 to the roller 56 (hereinafter this direction called "sub-scanning direction V"). In the resist compensation mode, a test image 178, which is paired of four colors (Y, M, C, B) and a test image, which is paired of four colors (Y, M, C, B), are formed on the transfer belt 52 to have a predetermined distance in a direction perpendicular to the sub-scanning direction V (hereinafter this direction called "main-scanning direction H"). The test images 178 and 180 are formed to correspond to image data for resist adjustment, which is stored in ROM in advance. The test images 178 and 180 are moved along the sub-scanning direction V in accordance with the movement of the transfer belt 52, and passed through the resist sensors 78 and 80. As a result, a shift between the test images 178, 180 and the resist sensors 78, 80 can be detected. In the resist compensation mode, the roller 72 for feeding paper P from the cassette 70 and the fixing unit 80 are maintained to be stopped.

More specifically, the first to fourth image forming units 50Y, 50M, 50C, and 50B are driven by the control of the main control unit 101, a predetermined voltage is applied onto the surface of each of the photosensitive members 58 of each of the image forming units 50. At the same time, the polygonal mirror 5a of the polygonal mirror unit 5 of the laser exposure unit 1 is rotated at a predetermined speed by the control of the image control CPU 111 of the image control section 110.

Sequentially, image data, which corresponds to the test image fetched from ROM, is fetched to the respective image memories 114 by the control of the image control CPU 111. Thereafter, a vertical sync signal V-sync is outputted from the timing control section 113 based on timing data, which is set by the timing setting unit 118, and resist compensation data, which is stored in the internal RAM of the timing control section 113. In a case where resist compensation data is not stored in the internal RAM, initial data stored in the ROM is used.

The vertical sync signal V-sync, which is outputted from the timing control section 113, is supplied to the respective data control sections 115.

The corresponding lasers 3 are operated by the corresponding laser drive sections 116, which are based on the vertical sync signal V-sync, and the laser beams L emitted from the lasers 3 are detected by the horizontal sync detector 23. Then, a predetermined clock numbers of the VCO 119 is counted after the horizontal sync signal H-sync is outputted from the horizontal sync signal generator 121. At this time, oscillation frequency data, which is initial data stored in the ROM, is supplied to the respective VCOs 119. In this case, initial data stored in the ROM is used till the output is inputted from the resist sensors 78 and 80. After counting the predetermined clock, image data stored in the image memories 114 is outputted by a predetermined timing.

Thereafter, by the control of the respective data control sections 115, a laser drive signal corresponding to image data is outputted to the respective lasers from the respective laser drive sections 116. Then, the laser beams L, which are intensity-modulated, are outputted from the respective lasers 3 based on image data. Therefore, the electrostatic latent image, which corresponds to test image data, is formed on the respective photosensitive members 58 of the respective image forming units 50 in which the predetermined voltage is set. By use of the respective developing units 62, the electrostatic latent image is developed with toner to which the corresponding color is provided, and converted to the test toner image, which is paired of four colors.

Two test toner images, each which is paired of four colors Y, M, C, B) and formed on the respective photosensitive members 58, are transferred onto the transfer belt 52 through the transfer units 64, and delivered to the resist sensors 78 and 80. When two test toner images are passed through the resist sensors 78 and 80, the resist sensors 78 and 80 output a predetermined output, which corresponds to the relative position of the respective test toner images wherein the positions of the resist sensors 78 and 80 are set as a reference position, that is, the shift of the test toner images. The test toner images formed on the transfer belt 52 are further transferred with the rotation of the transfer belt 52, and removed by the belt cleaner 82.

The respective outputs from the resist sensors 78 and 80 are inputted to the resist compensation calculation unit 117 to be used in the calculation of the shift of the respective test toner images.

The resist compensation calculation unit 117 detects the shift of the position of each pair of test toner images of each color, that is, 178Y and 180Y, 178M and 180M, 178C and 180C, and 178B and 180B formed to be separated by a predetermined distance in the sub-scanning direction. After the detection, the unit 117 calculates the average value, and defines an amount of compensation Vr of timing to output the vertical sync signal V-sync based on the difference between the calculated average value and the predetermined design value. Whereby, the shift, which is caused by the overlap of four images, in the sub-scanning direction is removed. In other words, the light-emitting timing of the respective lasers 3 of the laser exposure unit 1 is adjusted. In other words, the shift, which is caused when the distances between the respective image forming units 50 are different from each other, are removed. Then, there is removed the shift between the respective laser beams L emitted from the laser exposure 1 in connection with the distance in the sub-scanning direction.

Moreover, the resist compensation calculation unit 117 detects the shift of the position of each of the test toner images 178Y, 178M, 178C and 178B in the main-scanning direction. After the detection, the unit 117 calculates the average value, and defines an amount of compensation Hr of timing to output image data after the output of the horizontal sync signal H-sync based on the difference between the calculated average value and the predetermined design value. Whereby, there is adjusted timing in which the laser beams L, which are emitted from the respective lasers 3 of the laser exposure unit 1, are intensity-modulated by image data. In other words, the writing position of image data to be recorded onto the respective photosensitive members 58 of the respective image forming units 50 is adjusted in the main-scanning direction.

Furthermore, the resist compensation calculation unit 117 detects the shift of the position of each pair of test toner images of each color, that is, 178Y and 180Y, 178M and 180M, 178C and 180C, and 178B and 180B in the main-scanning direction. After the detection, the unit 117 calculates the average value, and defines an amount of compensation Fr of the oscillation frequency to be outputted from VOCs 119 based on the difference between the calculated average value and the predetermined design value.

Whereby, the length of the respective laser beams in the main-scanning direction per one clock, that is, the length of one line in the main-scanning direction to be image-formed on the respective photosensitive members 58, is adjusted.

The above amounts of compensation Vr, Hr, and Fr, which are obtained by the resist compensation calculation unit 117, are temporarily stored in the RAM of the timing control section 113. In this case, Vr, Hr, and Fr may be stored in the nonvolatile RAM 103. Moreover, these compensation operations are executed by the predetermined timing such as time when the compensation mode is selected by a control panel (not shown), time when a power supply switch (not shown) of the image forming unit 100 is turned on, or time when a number of papers to be printed, which is counted by a counter (not shown), reaches a predetermined number of papers.

The following will explain the image forming (normal) mode.

An image forming start signal is supplied by a control panel (not shown) or a host computer, so that the respective image forming units 50 is warmed up by the control of the main control unit 101, and the polygonal mirror 5a of the polygonal mirror unit 5 is rotated at a predetermined rotational speed by the control of the image control CPU 111.

Sequentially, image data to be printed is fetched to the RAM 102 from the outer memory unit, the host computer, or the scanner (image reading unit). A part (or all) of image data fetched into the RAM 102 is stored in each image memories 114 by the control of the image control CPU 111 of the image control unit 110. Moreover, the feeding roller 72 is driven by the control of the main control unit 101 in a state that a predetermined timing such as a vertical sync signal V-sync is used as a reference, thereby one paper P is picked up from the paper cassette 70. Then, the respective toner images Y, M, C, and B, which are provided by the image forming operation of each of the image forming units 50, and the timing are adjusted by the resist roller 74. The picked up paper P is adhered to the transfer belt 52 by the adsorption roller 76, and guided to the respective image forming units 50 in accordance with the rotation of the transfer belt 52.

On the other hand, at the same time with the paper feeding and transferring operations, the vertical sync signal V-sync is outputted from the timing control unit 113 based on data set by the timing setting unit 11B, resist data read from the internal RAM of the timing control unit 113, and clock data.

When the vertical sync signal V-sync is outputted from the timing control unit 113, the respective laser drive units 116 are driven by the respective data control units 115. Then, irradiation of each laser beam for one line in the main-scanning direction is provided to the respective photosensitive members 58 of the respective image forming units 50 from the respective lasers 3.

The number of clocks of the respective VCOs 119 is counted just after the input of the horizontal sync signal H-sync, which is generated by the horizontal sync signal generator 121, based on the laser beam for one line. When the number of clocks of the respective VCOs 119 reaches a predetermined value, image data to be printed is read from the respective image memories 114. Sequentially, in order to intensity-modulate the respective laser beams from the respective lasers 3, image data is transferred to the respective laser drive units 116 by the control of the respective control units 115, so that an image having no shift is formed on the respective photosensitive members 58 of the respective image forming units 50.

As a result, the respective laser beams, which are guided to the respective photosensitive members 58, are correctly image-formed on the respective photosensitive members 58. At this time, no influence of the deviation of the optical path, which is from the respective lasers 3 to the respective photosensitive members 58, is exerted on the above image formation. Moreover, the above image formation is not influenced by the variation of the position of each photosensitive member 58, which is caused by the deviation of the diameter of respective photosensitive members 58.

Each of the photosensitive members 58 is charged to a predetermined potential, and the potential is changed based on image data, whereby an electrostatic latent image corresponding to image data is formed on each of the photosensitive members 58. Each of the developing units 62 develops the electrostatic latent image with toner having a corresponding color to be converted to an toner image.

Each toner image is moved to paper P, which is delivered by the transfer belt 52, with the rotation of each of the photosensitive member 58, and transferred onto paper P on the transfer belt 62 at a predetermined timing by the transfer unit 64.

Whereby, the toner image in which four colors are correctly overlaid on paper P is formed on paper P. After the tone image is transferred onto paper P, the residual toner and the residual voltage, which are left on the respective photosensitive members 58, are removed by the respective cleaners 66 and the respective discharge lamps 68 to be used in the sequential image formation.

Paper P in which the four-colored toner image is electrostatically maintained is further transferred with the rotation of the transfer belt 52, and separated from the transfer belt 52 by the difference between the curvature of the belt drive roller 56 and linearity of paper P to be guided to the fixing unit 84. Paper P guided to the fixing unit 84 is discharged to a discharge tray (not shown) after toner is melted and the toner image as a color image is fixed by the fixing unit 84.

On the other hand, the transfer belt 52 is further rotated after paper P is supplied to the fixing unit 84, and undesired toner left on the surface is removed by the belt cleaner 82.

Even if the image-formed position of each of the laser beams LY, LM, LC, and LB, which is image-formed on the respective photosensitive members 58 of the respective image forming units by the laser exposure unit 1 of FIGS. 1 to 9, is precisely corrected, the position of the surface of each of the photosensitive members where the laser beams are actually image-formed is varied. The variation of the position of the surface of each of the photosensitive members is caused by the deviation of the diameter of each of the photosensitive members 58 at the time of the manufacture or the replacement of the photosensitive members at the time of deterioration.

FIG. 15 is a view showing the variation of the image plane P and the variation of a f value in the fθ characteristic.

In FIG. 15, the chief rays of light, which are passed through the final lens 31 of the post-deflection optical system 21, are extended to the side of the polygonal mirror unit 5, and an intersection of these beams of light is set to G. In this case, the extended lines of all chief rays of light are not always completely intersected at one point. However, $L_0$ is determined to satisfy $df/f_0 = \Delta P/L_0$ in a case where the f value of the fθ characteristic is changed to $f_0 + df$ from the set value $f_0$ by shifting the image plane P by $\Delta P$.

In this case, $f_0 + df$ is set to a value to satisfy the following equation.

$$y = (f_0 + df)\,\theta + y_0$$

wherein y: coordinates showing the position of the main beams of light at an imaginary position P' where the image-formed position P, which originally conforms to the surface of the photosensitive member 58 is moved by $\Delta P$ (the actual image-formed position obtained by the simulation); and θ: a swing angle of the laser beam reflected on the reflecting surface of the deflector.

At this time, the central position of the resist compensation pattern shown in FIGS. 12, 13, 14A, and 14B is placed at the position to satisfy the following equation.

$$\text{Arc tan}\,(y/L_0) = \Theta$$

wherein Θ is an angle between the chief ray of light and the optical axis of the post-deflection optical system at the image surface in the main-scanning direction.

Therefore, it is possible to simply obtain a suitable image frequency from the central position of the resist pattern based on the proportional relationship or the inverse proportional relationship. In other words, there can be obtained the number of clock pulses to be outputted from the respective VCOs 119 from time when the horizontal sync signal H-sync is inputted till the image is written.

In this case, though the horizontal sync signal H-sync must be inputted to timing control section 113, four laser beams, which are guided to the detector 23 by the horizontal sync mirror block 25, may be used as the horizontal sync signals H-sync for data control units 115Y, 115M, 115C, and 115B in order.

More specifically, it is assumed that the points shown in FIG. 15 are set as follows:

F: the position where the respective laser beams LY, LM, LC and LB are detected by the horizontal sync detector 23 is expanded to the point of the image plane P on the design in a state that the mirror block 25 for the horizontal sync signal is removed;

Z: an intersection of the optical axis of the post-deflection optical system 21 and the image plane P on the design;

B: a design position of the central position Ho of the resist pattern;

C: a design position of the central position Hd of the resist pattern;

yF: coordinates of F wherein Z is an origin;

yB: coordinates of B wherein Z is an origin;

yC: coordinates of C wherein Z is an origin;

F': a position where the horizontal sync signal H-sync is actually outputted;

Z': an intersection of the optical axis O of the post-deflection optical system 21 and the position P' where the laser beam is actually image-formed (based on the simulation);

B': the central position of the detected resist pattern;

C': the central position of the detected resist pattern;

yF': coordinates of F' wherein Z' is an origin;

yB': coordinates of B' wherein Z' is an origin;

yC': coordinates of C' wherein Z' is an origin;

$v_0$: an image frequency of the design value v: an image frequency after correction;

ω: an angle speed of the deflected laser beam:

cB: the number of pulses of an image clock (VCO 119) from the time when the horizontal sync signal H-sync is inputted till the laser beam reaches the point B;

cC: the number of pulses of an image clock (VCO 119) from the time when the horizontal sync signal H-sync is inputted till the laser beam reaches the point C;

δc: the amount of compensation of the number of clocks from the time when the horizontal sync signal H-sync is inputted till the image signal is outputted;

yB": coordinates of B' after correction; and yC": coordinates of C' after correction.

Based on the above points, design values, yB and yC can be expressed as follows:

$$yB = \frac{f_0 \omega}{v_0} cB + yF \quad (1)$$

$$yC = \frac{f_0 \omega}{v_0} cC + yF \quad (2)$$

Then, cB and cC can be obtained from equations (1) and (2) as follows:

$$cB = \frac{v_0(yB - yF)}{f_0 \omega} \quad (3)$$

$$cC = \frac{v_0(yC - yF)}{f_0 \omega} \quad (4)$$

yB' and yC' can be expressed as follows:

$$yB' = \frac{f \omega}{v_0} cB + yF' + \delta y \quad (5)$$

$$yC' = \frac{f \omega}{v_0} cC + yF' + \delta y \quad (6)$$

It is assumed that the laser beam to be arrived at the surface of the photosensitive member 58 is shifted by δy in the main-scanning direction for the reason that the frame of the laser exposure unit 1 and that of the image forming unit 100 are deformed.

Then, f and δy can be obtained from equations (5) and (6) as follows:

$$f = \frac{yB' - yC'}{yB - yC} f_0 \quad (7)$$

$$\delta y = \frac{yByC' - yCyB'}{yB - yC} \quad (8)$$

Therefore, yB" and yC" after correction can be expressed as follows:

$$yB" = \frac{f \omega}{v} (cB - \delta c) + yF' + \delta y \quad (9)$$

$$yC" = \frac{f \omega}{v} (cC - \delta c) + yF' + \delta y \quad (10)$$

Therefore, the following equations must be satisfied in order to equalize the position after correction with the design value:

$$yB = yB" \quad (11)$$

$$yC = yC" \quad (12)$$

Then, v and δc can be obtained from the equations (11) and (12) as follows:

$$v = \frac{yB' - yC'}{yB - yC} v_0 \quad (13)$$

$$\delta c = \frac{v_0(yCyB' - yByC' + (yB - yC - yB' + yC')yF)}{f_0 \omega (yB - yC)} \quad (14)$$

Therefore, as shown in FIG. 15, in a case where the image plane P is shifted in a direction of an arrow A to be moved to the position P', each of the laser beams LY, LM, LC and LB, which is emitted from each of the lasers 3Y, 3M, 3C, and 3B, is image-formed at the position which is moved by ΔP from the design value in the focal distance direction and the main-scanning direction.

In this case, as already explained, for example, image data to be image-formed at the point C is image-formed at the point C'. This shows that the distance $\overline{ZC}$ of the main-scanning direction is increased to $\overline{Z'C'}$.

The variation of the distance in the main-scanning direction can be easily corrected by changing a oscillation frequency outputted from each of the VCOs 119 of the image control unit 110 of the laser exposure unit 1 in accordance with the ratio of $\overline{(Z'C')}/\overline{(ZC)}$.

As explained above, by use of each of the VCOs 119, the width of the line of each color can be set to be the same by changing the oscillation frequency $v_0$, which is set by the timing setting means 118, to the value v expressed by equation (13).

Moreover, the positional shift in the main-scanning direction can be corrected by correcting the amount of correction of the number of clocks by the amount δC shown by equation (14) from the time when the horizontal sync signal H-sync is inputted till the image signal is supplied.

Therefore, the image shift of the main-scanning direction, which is caused by the deviation of the diameter of each of the photosensitive members 58, can be corrected.

Figure 16:
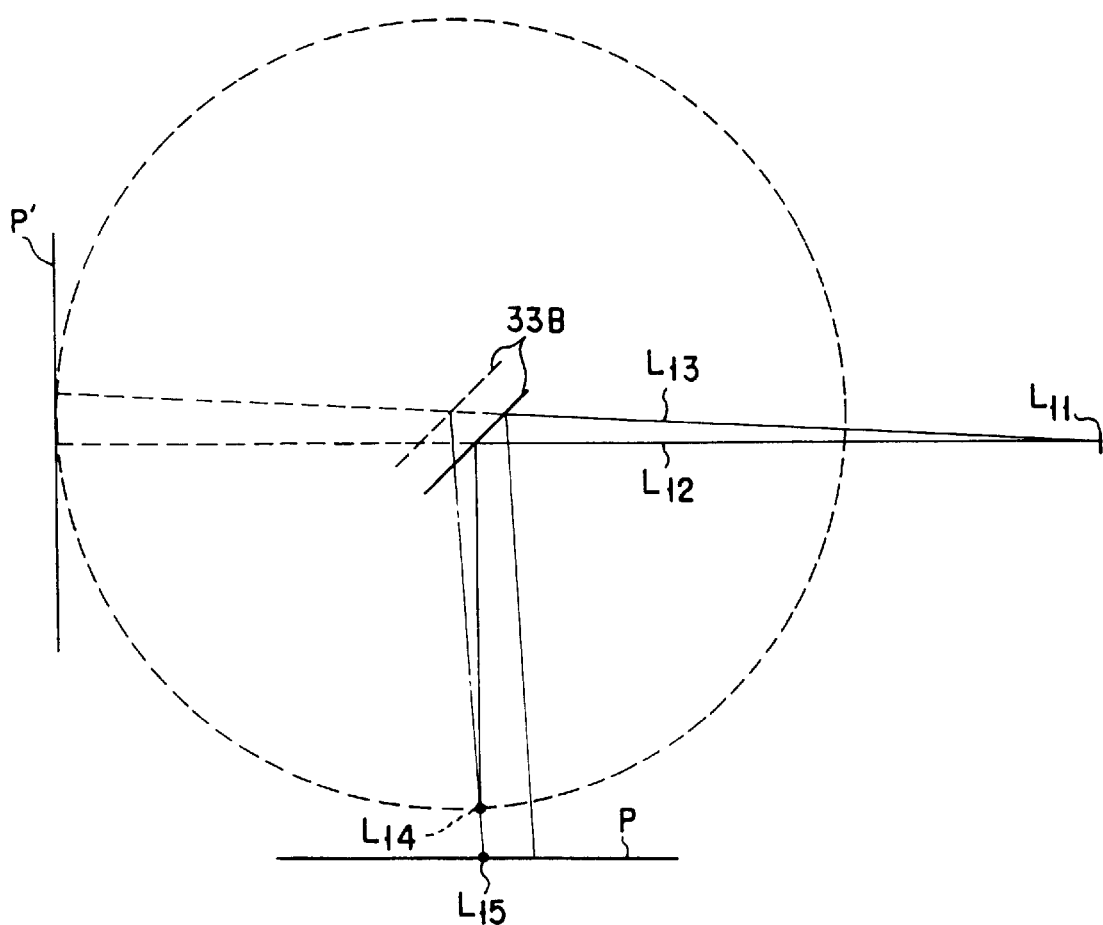
FIG. 16 is a partial cross sectional view showing a state of the shift from an image forming position of a laser beam, which passes each point of the main-scanning direction of FIG. 15, when a laser is inclined, seeing from a sub-scanning direction.

FIG. 16 is a view of the optical path showing the relationship between the position where the laser beams are image-formed and the shift of the image plane P (inclination of mirror) in a state that one of lens is inclined in correction with the laser beams passed through the points B' and C' of FIG. 15 and the respective mirrors 37Y, 37M, 37C and the laser beams reflected by the mirror 33B (In FIG. 16, the mirror 33B corresponding to the black laser beam LB is typically shown and only the focus is explained).

In FIG. 16, $L_{11}$ imaginarily shows a position where an inclination is generated in the sub-scanning direction when the laser beam LB reflected by the respective reflecting surfaces $5_{-1}$ to $5_{-8}$ of the polygonal mirror unit 5 is passed through the lenses 27, 29 and 31. $L_{12}$ is a laser beam, which is passed through the point B' of FIG. 15, and $L_{13}$ is a laser beam, which is passed through the point C' of FIG. 15.

According to FIG. 16, in a case where the mirror 33B does not exist, the laser beam is image-formed at the point P', which is different from the original image-forming point P, which is a part of the circle shown by a broken line. In a case where the mirror 33B is correctly provided at an angle of 45°, (shown by a solid line), $L_{12}$ and $L_{13}$ are correctly image-formed on the image-forming position where the laser beam is originally image-formed, that is, the image plane P on the design.

In contrast, in order to reduce the tilt of the main-scanning line, in a case where the inclination of the mirror 33B is adjusted (shown by a dotted line), $L_{12}$ reaches at the position, which is shown by $L_{15}$ on the original image-forming position P, and $L_{13}$ reaches at the position, which is shown by $L_{14}$ on the position P' separated from the original image-forming position P. In this case, it is needless to say that $L_{14}$ is defocused. This means adjusting main scanning line's tilt caused by lens tilt increases the defocus amount. Therefore relative adjustment based on LB is preferable.

As mentioned above, the laser exposure unit of the present invention includes:

two or more light sources provided at positions where no interference is generated each other; pre-deflection optical means, having a plurality of lenses and reflecting surfaces, for bending at least one beam sent from the light sources so as to form a cross sectional shape of the beam sent from each light source to a predetermined shape and to provide a group of light of beam serving as a flux of light of beam; deflecting means, having a rotatable reflecting surface, for rotating the reflecting surface in a predetermined direction to deflect the group of light of beam in a first direction; image-forming optical means, having a plurality of lenses and a plurality of reflecting surfaces, for separating the group of light of beam deflected by the deflecting means into the original number of beams to form the cross sectional shape of the respective beams to a predetermined shape and to focus the respective beams on a predetermined position of the predetermined corresponding image surface to be scanned at an equal speed; reflecting means for picking up a part of the group of light of beam deflected by the deflecting means after being passed through at least one lens of the image-forming optical means such that the part of the group of light of beam is guided to pass through a predetermined point in a second direction to be reflected in a different direction in the first direction; signal generating means for generating a signal having a predetermined level every time when the beam is made incident from the respective light sources through the reflecting means; and detecting optical means, provided to correspond to each of the light sources, having a clock generator for generating a reference clock in driving each of the light sources based on the signal generated by the signal generating means.

The pre-deflection optical has a housing for supporting the plurality of light sources, the plurality of lenses and the reflecting means as a one unit to reduce a shift of an undesired image. Since the beams sent from the plurality of the light sources are put into one and made to be incident onto the reflecting surface of the deflector, the transmissivity is improved and the output of the light source can be reduced as compared with the case using a half mirror. Moreover, an optical path between the light source and the reflecting means is formed to symmetrically sandwich an optical axis therebetween, symmetry can be obtained in the character of light guided to the image-forming position. In this case, since the optical path between the light source and the reflecting means is independently formed to correspond to each light source, the cost of the respective elements can be reduced.

The image-forming optical means has a plurality of lenses to be formed such that the direction of the axis of rotation of at least one lens surface is perpendicular to the axis of rotation of the other lens surface. The position of the beam passing through the lens, which is provided at the portion closest to the light source, and the position of the beam passing through the lens, which is provided at the portion closest to the image-forming position, are inversely set to sandwich the optical axis therebetween. Due to this, the characteristic of light passed through the respective lenses is equalized. Moreover, since these lenses are formed of the same material as at least one lens of the light source side optical means, the variation of the diameter of each light at the image-forming position, which is caused by the change of the refractive index due to the change of temperature, can be reduced. Furthermore, the number of each of the mirrors after deflection is defined to be odd or even, and all reflecting surfaces are fixed in at least one optical path, and at least one surface is formed to be movable in the other optical path. Due to this, at least one beam, which is passed through the lens provided at the portion closest to the image-forming position, is set as a reference, thereby degree of parallelization of the other beams can be easily controlled, and the direction of the beam bending in the first direction can be set be the same direction.

Also, according to the present invention, an image forming unit into which a laser polygonal mirror unit is incorporated comprises image transferring means provided to be movable in a second direction perpendicular to a first direction; two image detecting means, provided at a position where a pattern is written to the image transferring means by image forming means, for detecting the position of the pattern written in the image transferring means through a laser exposure unit by the control of the image forming means; image position calculation means for calculating a shift of an image formed on the image transferring means based on the result of the detection outputted from the image detecting means; and image controlling means for changing timing for driving each optical light source of the laser exposure unit, and writing timing controlled by the image forming unit and a frequency of a clock generating means based on the shift of the image obtained by the image position calculation means.

A center of the image is calculated based on image position data of each of two patterns formed in the first direction, which obtained by the image position calculation means, and a horizontal sync timing is controlled. Moreover, based on image position data, which is obtained by the image position calculation means, the number of clocks, which is used from the time when the horizontal sync timing is outputted till the pattern, is counted, and an oscillation frequency to be supplied to the clock generating means is defined, thereby removing the color shift of the images, which are overlaid and outputted.

Also, in the case that it is detected that a f value of the position where the beam from the laser exposure unit is image-formed is changed from $f_0$ to $f_0+df$, the oscillation frequency $v_0$ to be supplied to the clock generating unit can be changed to $v_0$ (df+f)/f. Due to this, even if the image-forming position is changed, only the driving frequency of the light source of the laser exposure unit may be changed, and the color shift of the images, which are overlaid and outputted, can be removed.

Therefore, there can be provided an image forming unit, which can provide a color image having no color shift with low cost, and a multi-beam laser exposure unit, which is suitable for the image forming unit.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical exposure unit for guiding beams to be scanned to a predetermined image plane, comprising:

a plurality of light sources for generating a plurality of beams;

first optical means for making the plurality of beams generated by said light sources close to each other to be guided;

deflecting means having a surface on which the plurality of beams made close to each other guided by said first optical means are incident so as to deflect the beams incident on said surface to a predetermined direction; and second optical means, for guiding the beams deflected by said deflecting means to said image plane as a plurality of beams having a predetermined distance from each other;

wherein said first optical means includes a first lens having curvature in only a sub-scanning direction, a second lens having a curvature whose absolute value is equal to the curvature of said first lens and whose polarity is opposite to said first lens, the respective lenses are formed of material whose change rate of a refractive index due to a variation of temperature is different, and provided such that the surfaces having a curvature are mutually contacted, and wherein at least one of said first and second lenses of said first optical means is formed of a material which is identical to a material of which said second optical means is formed.

2. An optical exposure unit for guiding beams to be scanned to a predetermined image plane, comprising:

a plurality of light sources for generating a plurality of beams;

first optical means for making the plurality of beams generated by said light sources close to each other to be guided;

deflecting means having a surface on which the plurality of beams made close to each other guided by said first optical means are incident so as to deflect the beams incident on said surface to a predetermined direction;

second optical means, for guiding the beams deflected by said deflecting means to said image plane as a plurality of beams having a predetermined distance from each other; and third optical means for picking up a part of the group of light of beams deflected by said deflecting means to be passed through a predetermined one point after being passed through said second optical means.

3. The optical exposure unit according to claim 2, wherein said third optical means includes a plurality of reflecting surfaces as said light sources to reflect each beam from the light source and in a different direction, with a different angle, respectively.

4. The optical exposure unit according to claim 2, wherein said third optical means includes signal generating means for generating a signal having a predetermined level every time when the beam is inputted from each of said light sources, and a clock generating unit for outputting a reference clock used to drive the corresponding light source at a predetermined timing when said signal generated by said signal generating means is inputted.

* * * * *